US012771684B2

(12) United States Patent
Nachbaur

(10) Patent No.: US 12,771,684 B2
(45) Date of Patent: Oct. 20, 2026

(54) TECHNIQUES FOR INTER-CLIENT AUTHORIZATION

(71) Applicant: OKTA, INC., San Francisco, CA (US)

(72) Inventor: Alexandra Minerva Nachbaur, Surrey (CA)

( * ) Notice: Subject to any disclaimer, the term of this patent is extended or adjusted under 35 U.S.C. 154(b) by 243 days.

(21) Appl. No.: 18/426,057

(22) Filed: Jan. 29, 2024

(65) Prior Publication Data

US 2025/0247385 A1 Jul. 31, 2025

(51) Int. Cl.
*H04L 9/40* (2022.01)
*H04L 9/32* (2006.01)

(52) U.S. Cl.
CPC ........ *H04L 63/0838* (2013.01); *H04L 63/083* (2013.01); *H04L 9/3213* (2013.01); *H04L 9/3228* (2013.01); *H04L 63/0807* (2013.01)

(58) Field of Classification Search
CPC ............... H04L 63/0807; H04L 63/083; H04L 63/0838; H04L 9/40; H04L 9/32; H04L 9/3213; H04L 9/3228
See application file for complete search history.

(56) References Cited

U.S. PATENT DOCUMENTS 11,593,452 B1 * 2/2023 Chen .................. G06F 16/9035
2012/0054491 A1 * 3/2012 Tippett .................. H04L 9/3213 713/168
2014/0215589 A1 * 7/2014 Dietrich .................. G06F 21/34 726/6
2022/0109675 A1 * 4/2022 Williams .............. H04L 63/062
2024/0137765 A1 * 4/2024 Jost ........................ H04W 12/69

FOREIGN PATENT DOCUMENTS

CN 108769059 B * 11/2021 ......... H04L 63/0838
EP 2913955 A1 * 9/2015 ......... H04L 63/0428
WO WO-2013030060 A1 * 3/2013 ............. G06F 21/34

* cited by examiner

*Primary Examiner* — Jayesh M Jhaveri
(74) *Attorney, Agent, or Firm* — Holland & Hart LLP

(57) ABSTRACT

A method for session handover via an inter-client token is described. The method may include performing a first authorization procedure to establish a first session for a user at a source client, the first authorization procedure being performed via a first authorization server. The source client may receive, from the first authorization server based on the first authorization procedure, an identity token including an identifier of the user and an indication of authentication methods associated with the first authorization procedure. The source client may transmit an inter-client token to a target client, where the inter-client token may be based on the identity token and usable for establishing a second session for the user at the target client. The target client may transmit the inter-client token to a second authorization server and establish, based on the inter client token, the session for the user via the second authorization server.

20 Claims, 13 Drawing Sheets

TECHNIQUES FOR INTER-CLIENT AUTHORIZATION

FIELD OF TECHNOLOGY

The present disclosure relates generally to identity management, and more specifically to techniques for inter-client authorization.

BACKGROUND

An identity management system may be employed to manage and store various forms of user data, including usernames, passwords, email addresses, permissions, roles, group memberships, etc. The identity management system may provide authentication services for applications, devices, users, and the like. The identity management system may enable organizations to manage and control access to resources, for example, by serving as a central repository that integrates with various identity sources. The identity management system may provide an interface that enables users to access a multitude of applications with a single set of credentials. In some cases, a user may use the identity management system to access multiple types of applications, such as native applications and web-based applications.

SUMMARY

The described techniques relate to improved methods, systems, devices, and apparatuses that support inter-client authorization. For example, such techniques may provide a framework for securely transferring a session between a source client and a target client. In some examples, a user may perform a first authorization procedure at a source client to establish a first session. After performing the first authorization procedure, the user may receive an identity token. For example, the source client may generate, from the identity token, an inter-client token to be used to establish a second session at a target client. The identity token, the inter-client token, or both may include an indication of authentication methods associated with the first authorization procedure and a cryptographic signature of an authorization server that performed the first authorization procedure. The target client may use the inter-client token to establish the second session. For example, the target client may provide the inter-client token to a second authorization server as proof of the user having performed the first authorization procedure. If the authentication methods associated with the first authorization procedure satisfy authentication requirements at the target client and if the first authorization server has a trust relationship with the second authorization server, the target client may establish the second session.

A method for establishing sessions via one or more authorization servers by an apparatus is described. The method may include performing a first authorization procedure to establish a first session for a user at a source client, the first authorization procedure being performed via a first authorization server of the one or more authorization servers, receiving, from the first authorization server based on the first authorization procedure, an identity token including at least an identifier of the user and an indication of one or more authentication methods associated with the first authorization procedure, and transmitting, to a target client, an inter-client token that is based on the identity token, where the inter-client token is usable for establishing a second session for the user at the target client.

An apparatus for establishing sessions via one or more authorization servers is described. The apparatus may include one or more memories storing processor executable code, and one or more processors coupled with the one or more memories. The one or more processors may individually or collectively be operable to execute the code to cause the apparatus to perform a first authorization procedure to establish a first session for a user at a source client, the first authorization procedure being performed via a first authorization server of the one or more authorization servers, receive, from the first authorization server based on the first authorization procedure, an identity token including at least an identifier of the user and an indication of one or more authentication methods associated with the first authorization procedure, and transmit, to a target client, an inter-client token that is based on the identity token, where the inter-client token is usable for establishing a second session for the user at the target client.

Another apparatus for establishing sessions via one or more authorization servers is described. The apparatus may include means for performing a first authorization procedure to establish a first session for a user at a source client, the first authorization procedure being performed via a first authorization server of the one or more authorization servers, means for receiving, from the first authorization server based on the first authorization procedure, an identity token including at least an identifier of the user and an indication of one or more authentication methods associated with the first authorization procedure, and means for transmitting, to a target client, an inter-client token that is based on the identity token, where the inter-client token is usable for establishing a second session for the user at the target client.

A non-transitory computer-readable medium storing code for establishing sessions via one or more authorization servers is described. The code may include instructions executable by one or more processors to perform a first authorization procedure to establish a first session for a user at a source client, the first authorization procedure being performed via a first authorization server of the one or more authorization servers, receive, from the first authorization server based on the first authorization procedure, an identity token including at least an identifier of the user and an indication of one or more authentication methods associated with the first authorization procedure, and transmit, to a target client, an inter-client token that is based on the identity token, where the inter-client token is usable for establishing a second session for the user at the target client.

Some examples of the method, apparatus, and non-transitory computer-readable medium described herein may further include operations, features, means, or instructions for generating the inter-client token based on the identity token, where transmitting the inter-client token may be in accordance with the generating and where the inter-client token includes at least the identifier of the user and the indication of the one or more authentication methods.

In some examples of the method, apparatus, and non-transitory computer-readable medium described herein, receiving the identity token may include operations, features, means, or instructions for receiving the identity token based on a user operation at the source client.

In some examples of the method, apparatus, and non-transitory computer-readable medium described herein, receiving the identity token may include operations, features, means, or instructions for receiving the identity token and one or more of a session token, an actor token, or a refresh token based on the user operation at the source client.

In some examples of the method, apparatus, and non-transitory computer-readable medium described herein, the inter-client token further includes one or more of an indication of an expiration of the inter-client token, an identifier of the inter-client token to be stored at a second authorization server after use of the inter-client token, or an identifier of the target client.

In some examples of the method, apparatus, and non-transitory computer-readable medium described herein, the identity token includes a signature based on the identity token being cryptographically signed via the first authorization server, and where establishing the second session may be based on the signature being valid.

In some examples of the method, apparatus, and non-transitory computer-readable medium described herein, the indication of the one or more authentication methods includes a set of multiple values associated with the one or more authentication methods.

In some examples of the method, apparatus, and non-transitory computer-readable medium described herein, the inter-client token includes a one-time use token.

In some examples of the method, apparatus, and non-transitory computer-readable medium described herein, transmitting the inter-client token to the target client may include operations, features, means, or instructions for transmitting the inter-client token to the target client via a uniform resource locator (URL) redirect, an application deep link, a BLUETOOTH link, a near field communication (NFC) app-to-app exchange, a quick response (QR) code, a local transmission control protocol (TCP) or internet protocol (IP), or any combination thereof.

In some examples of the method, apparatus, and non-transitory computer-readable medium described herein, the inter-client token may be usable for establishing the second session via the first authorization server or a second authorization server of the one or more authorization servers, and where the inter-client token may be usable for establishing the second session according to the first authorization procedure or a second authorization procedure.

In some examples of the method, apparatus, and non-transitory computer-readable medium described herein, the source client includes a first application on a first device and the target client includes a second application on the first device or a second device.

In some examples of the method, apparatus, and non-transitory computer-readable medium described herein, the first application includes a first type of application and the second application includes a second type of application that may be different from the first type of application.

A method for establishing sessions via one or more authorization servers by an apparatus is described. The method may include receiving, from a source client, an inter-client token including at least an identifier of a user and an indication of a first set of authentication methods associated with a first authorization procedure between the source client and a first authorization server of the one or more authorization servers, where the inter-client token is usable for establishing a session for the user at a target client, transmitting the inter-client token to a second authorization server of the one or more authorization servers, and establishing, based on the inter-client token, the session for the user at the target client and via the second authorization server, where the session is established in accordance with a second authorization procedure between the target client and the second authorization server.

An apparatus for establishing sessions via one or more authorization servers is described. The apparatus may include one or more memories storing processor executable code, and one or more processors coupled with the one or more memories. The one or more processors may individually or collectively be operable to execute the code to cause the apparatus to receive, from a source client, an inter-client token including at least an identifier of a user and an indication of a first set of authentication methods associated with a first authorization procedure between the source client and a first authorization server of the one or more authorization servers, where the inter-client token is usable for establishing a session for the user at a target client, transmit the inter-client token to a second authorization server of the one or more authorization servers, and establish, based on the inter-client token, the session for the user at the target client and via the second authorization server, where the session is established in accordance with a second authorization procedure between the target client and the second authorization server.

Another apparatus for establishing sessions via one or more authorization servers is described. The apparatus may include means for receiving, from a source client, an inter-client token including at least an identifier of a user and an indication of a first set of authentication methods associated with a first authorization procedure between the source client and a first authorization server of the one or more authorization servers, where the inter-client token is usable for establishing a session for the user at a target client, means for transmitting the inter-client token to a second authorization server of the one or more authorization servers, and means for establishing, based on the inter-client token, the session for the user at the target client and via the second authorization server, where the session is established in accordance with a second authorization procedure between the target client and the second authorization server.

A non-transitory computer-readable medium storing code for establishing sessions via one or more authorization servers is described. The code may include instructions executable by one or more processors to receive, from a source client, an inter-client token including at least an identifier of a user and an indication of a first set of authentication methods associated with a first authorization procedure between the source client and a first authorization server of the one or more authorization servers, where the inter-client token is usable for establishing a session for the user at a target client, transmit the inter-client token to a second authorization server of the one or more authorization servers, and establish, based on the inter-client token, the session for the user at the target client and via the second authorization server, where the session is established in accordance with a second authorization procedure between the target client and the second authorization server.

Some examples of the method, apparatus, and non-transitory computer-readable medium described herein may further include operations, features, means, or instructions for receiving, from the second authorization server and in response to a user operation at the target client, a second inter-client token including at least the identifier of the user and an indication of a second set of authentication methods, where the second set of authentication methods may be associated with the first authorization procedure and the second authorization procedure.

Some examples of the method, apparatus, and non-transitory computer-readable medium described herein may further include operations, features, means, or instructions for receiving, from the second authorization server, a request to verify an identity of the user via an authentication method, where receiving the request may be based on an assurance level associated with the first set of authentication methods failing to satisfy a threshold level of assurance associated with the second authorization procedure, where establishing the session for the user at the target client may be based on successfully verifying the identity of the user via the authentication method.

In some examples of the method, apparatus, and non-transitory computer-readable medium described herein, the indication of the first set of authentication methods includes a set of multiple values associated with the first set of authentication methods.

Some examples of the method, apparatus, and non-transitory computer-readable medium described herein may further include operations, features, means, or instructions for receiving, with the inter-client token, one or more of an indication of an expiration of the inter-client token, an identifier of the inter-client token to be stored at the second authorization server after use of the inter-client token, or an indication of the target client.

In some examples of the method, apparatus, and non-transitory computer-readable medium described herein, the inter-client token includes a signature based on the inter-client token being cryptographically signed via the first authorization server, and where establishing the session may be based on the signature being valid.

In some examples of the method, apparatus, and non-transitory computer-readable medium described herein, the inter-client token includes a one-time use token.

In some examples of the method, apparatus, and non-transitory computer-readable medium described herein, receiving the inter-client token from the source client may include operations, features, means, or instructions for receiving the inter-client token from the source client via a URL redirect, an application deep link, a BLUETOOTH link, a NFC app-to-app exchange, a QR code, a local TCP or IP, or any combination thereof.

Some examples of the method, apparatus, and non-transitory computer-readable medium described herein may further include operations, features, means, or instructions for establishing the session may be further based on a trust relationship between the first authorization server and the second authorization server.

DETAILED DESCRIPTION

Figure 1:
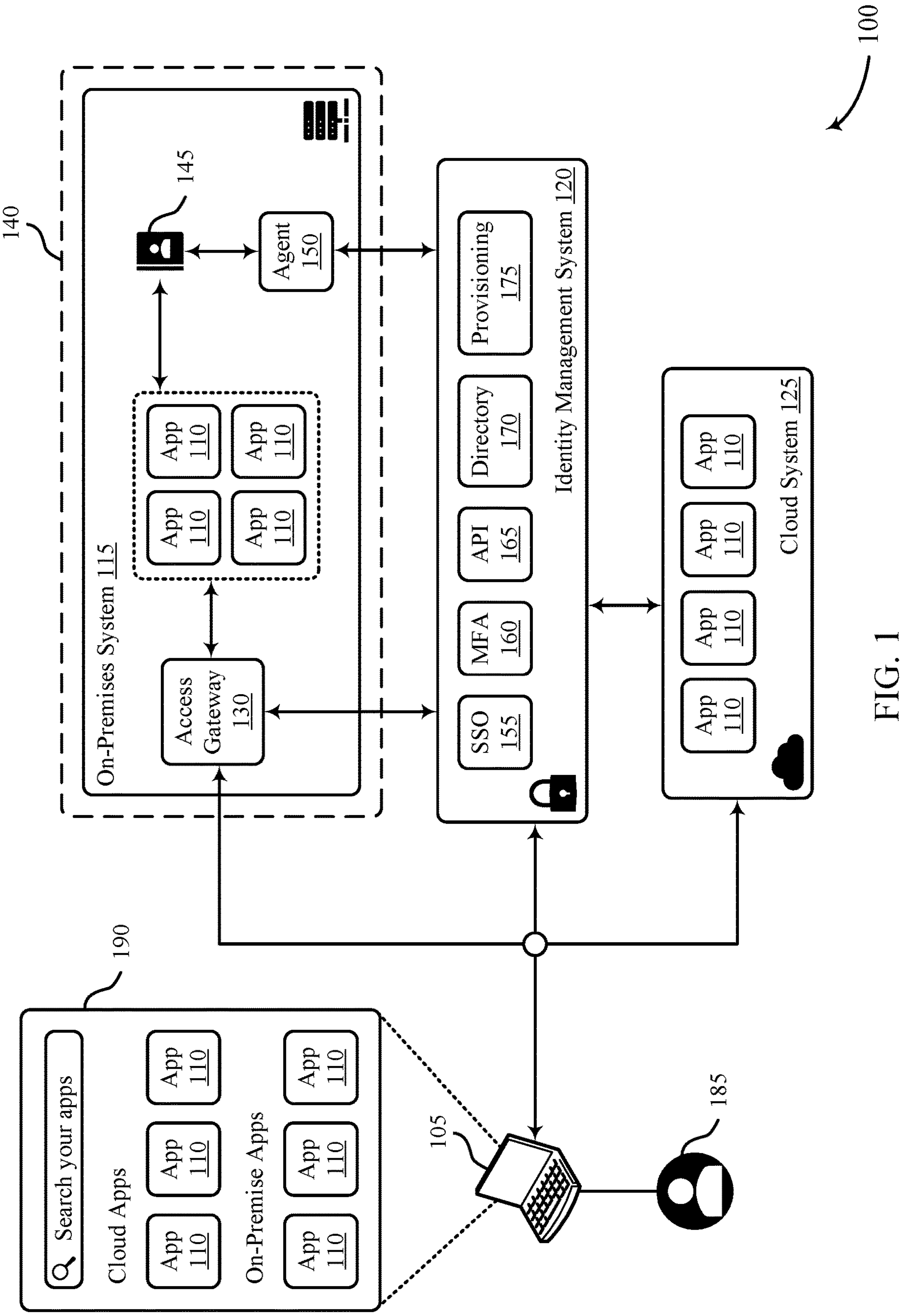
FIGS. 1 and 2 show an example of computing systems that support techniques for inter-client authorization in accordance with aspects of the present disclosure.

A user may establish sessions with multiple clients via a single sign-on (SSO). For example, the user may sign in to a user account on a first client (e.g., a source client) and establish a session. When the session is a web session (e.g., is established for a web-based application), the SSO may involve a browser cookie, such as a session cookie (e.g., a session-only cookie) or a persistent cookie (e.g., a lifetime cookie). The browser may store the cookie such that when the user accesses a user account on a second client, the user may gain access to the user account on the second client based on the cookie (e.g., without performing another a sign in or authentication procedure). In some cases, however, the SSO may not support transfer of non-web sessions (e.g., sessions established for native applications). As such, a user may not be able to use the cookie to transfer a session between a native application and a web application and/or between multiple native applications. Additionally, cookies may be susceptible to security vulnerabilities, such as session hijacking or one or more other types if attacks in which a malicious actor may fraudulently obtain the cookie and use the cookie for unauthorized access.

Various aspects of the present disclosure relate to inter-client authorization. For example, aspects of the disclosure relate to securely transferring a session between a source client and a target client. In some examples, a user may perform a first authorization procedure at a source client to establish a first session. After performing the first authorization procedure, the user may receive an identity token. The source client may transmit an inter-client token, which is based on the identity token to the target client, and the target client may use the inter-client token to establish the second session. For example, the target client may provide the inter-client token to a second authorization server as proof of the user having performed the first authorization procedure. In other words, the user may use the inter-client token to transfer a session between multiple (e.g., different) clients.

In some examples, the source client may generate the inter-client token from the identity token. The identity token, the inter-client token, or both, may include an indication of authentication methods associated with the first authorization procedure and a cryptographic signature of an authorization server that performed the first authorization procedure. For example, if the authentication methods associated with the first authorization procedure satisfy authentication constraints (e.g., requirements, a threshold assurance level) at the target client and if the first authorization server has a trust relationship with the second authorization server, the target client may establish the second session. In some other examples, the authentication methods associated with the first authorization procedure may fail to satisfy the authentication constraints of the target client. In such examples, the second authorization server may request that the user perform one or more actions (e.g., perform other authentication methods, verify their identity, perform additional authorization procedures), such that the authentication constraints of the target client may be satisfied, prior to establishing the session. In other words, if the first authorization procedure does not satisfy the authentication requirements at the target client, the second authorization server may request additional verification or authorization (e.g., regardless of a trust relationship with the first authorization server) without re-verification of the authentication methods associated with the first authorization procedure.

Using the inter-client token may lead to increased security and improved user experience related to the SSO. For example, the inter-client token may support transfer of a session between multiple clients on a user device where the clients may represent native applications and/or web applications. In other words, the inter-client token may support SSO across multiple clients (e.g., multiple clients of the same type, multiple clients of different types) on a device without the use of a browser cookie, which may be vulnerable to session hijacking. For example, the inter-client token may be a single-use token usable for a relatively short duration compared to a browser cookie, which may be stored in a memory of the device and thus be susceptible to hijacking.

Aspects of the disclosure are initially described in the context of computing systems. Aspects of the disclosure are also described in the context of a process flow. Aspects of the disclosure are further illustrated by and described with reference to apparatus diagrams, system diagrams, and flowcharts that relate to techniques for inter-client authorization.

FIG. 1 illustrates an example of a computing system 100 that supports techniques for inter-client authorization in accordance with various aspects of the present disclosure. The computing system 100 includes a computing device 105 (such as a desktop, laptop, smartphone, tablet, or the like), an on-premises system 115, an identity management system 120, and a cloud system 125, which may communicate with each other via a network, such as a wired network (e.g., the Internet), a wireless network (e.g., a cellular network, a wireless local area network (WLAN)), or both. In some cases, the network may be implemented as a public network, a private network, a secured network, an unsecured network, or any combination thereof. The network may include various communication links, hubs, bridges, routers, switches, ports, or other physical and/or logical network components, which may be distributed across the computing system 100.

The on-premises system 115 (also referred to as an on-premises infrastructure or environment) may be an example of a computing system in which a client organization owns, operates, and maintains its own physical hardware and/or software resources within its own data center(s) and facilities, instead of using cloud-based (e.g., off-site) resources. Thus, in the on-premises system 115, hardware, servers, networking equipment, and other infrastructure components may be physically located within the "premises" of the client organization, which may be protected by a firewall 140 (e.g., a network security device or software application that is configured to monitor, filter, and control incoming/outgoing network traffic). In some examples, users may remotely access or otherwise utilize compute resources of the on-premises system 115, for example, via a virtual private network (VPN).

In contrast, the cloud system 125 (also referred to as a cloud-based infrastructure or environment) may be an example of a system of compute resources (such as servers, databases, virtual machines, containers, and the like) that are hosted and managed by a third-party cloud service provider using third-party data center(s), which can be physically co-located or distributed across multiple geographic regions. The cloud system 125 may offer high scalability and a wide range of managed services, including (but not limited to) database management, analytics, machine learning (ML), artificial intelligence (AI), etc. Examples of cloud systems 125 include (AMAZON WEB SERVICES) AWS®, MICROSOFT AZURE®, GOOGLE CLOUD PLATFORM®, ALIBABA CLOUD®, ORACLE® CLOUD INFRASTRUCTURE (OCI), and the like.

The identity management system 120 may support one or more services, such as an SSO service 155, a MFA service 160, an application programming interface (API) service 165, a directory management service 170, or a provisioning service 175 for various on-premises applications 110 (e.g., applications 110 running on compute resources of the on-premises system 115) and/or cloud applications 110 (e.g., applications 110 running on compute resources of the cloud system 125), among other examples of services. The SSO service 155, the MFA service 160, the API service 165, the directory management service 170, and/or the provisioning service 175 may be individually or collectively provided (e.g., hosted) by one or more physical machines, virtual machines, physical servers, virtual (e.g., cloud) servers, data centers, or other compute resources managed by or otherwise accessible to the identity management system 120.

A user 185 may interact with the computing device 105 to communicate with one or more of the on-premises system 115, the identity management system 120, or the cloud system 125. For example, the user 185 may access one or more applications 110 by interacting with an interface 190 of the computing device 105. In some implementations, the user 185 may be prompted to provide some form of identification (such as a password, personal identification number (PIN), biometric information, or the like) before the interface 190 is presented to the user 185. In some implementations, the user 185 may be a developer, customer, employee, vendor, partner, or contractor of a client organization (such as a group, business, enterprise, non-profit, or startup that uses one or more services of the identity management system 120). The applications 110 may include one or more on-premises applications 110 (hosted by the on-premises system 115), mobile applications 110 (configured for mobile devices), and/or one or more cloud applications 110 (hosted by the cloud system 125).

The SSO service 155 of the identity management system 120 may allow the user 185 to access multiple applications 110 with one or more credentials. Once authenticated, the user 185 may access one or more of the applications 110 (for example, via the interface 190 of the computing device 105). That is, based on the identity management system 120 authenticating the identity of the user 185, the user 185 may obtain access to multiple applications 110, for example, without having to re-enter the credentials (or enter other credentials). The SSO service 155 may leverage one or more authentication protocols, such as Security Assertion Markup Language (SAML) or OpenID Connect (OIDC), among other examples of authentication protocols. In some examples, the user 185 may attempt to access an application 110 via a browser. In such examples, the browser may be redirected to the SSO service 155 of the identity management system 120, which may serve as the identity provider (IdP). For example, in some implementations, the browser (e.g., the user's request communicated via the browser) may be redirected by an access gateway 130 (e.g., a reverse proxy-based virtual application configured to secure web applications 110 that may not natively support SAML or OIDC).

In some examples, the access gateway 130 may support integrations with legacy applications 110 using hypertext transfer protocol (HTTP) headers and Kerberos tokens, which may offer universal resource locator (URL)-based authorization, among other functionalities. In some examples, such as in response to the user's request, the IdP may prompt the user 185 for one or more credentials (such as a password, PIN, biometric information, or the like) and the user 185 may provide the requested authentication credentials to the IdP. In some implementations, the IdP may leverage the MFA service 160 for added security. The IdP may verify the user's identity by comparing the credentials provided by the user 185 to credentials associated with the user's account. For example, one or more credentials associated with the user's account may be registered with the IdP (e.g., previously registered, or otherwise authorized for authentication of the user's identity via the IdP). The IdP may generate a security token (such as a SAML token or Oath 2.0 token) containing information associated with the identity and/or authentication status of the user 185 based on successful authentication of the user's identity.

The IdP may send the security token to the computing device 105 (e.g., the browser or application 110 running on the computing device 105). In some examples, the application 110 may be associated with a service provider (SP), which may host or manage the application 110. In such examples, the computing device 105 may forward the token to the SP. Accordingly, the SP may verify the authenticity of the token and determine whether the user 185 is authorized to access the requested applications 110. In some examples, such as examples in which the SP determines that the user 185 is authorized to access the requested application, the SP may grant the user 185 access to the requested applications 110, for example, without prompting the user 185 to enter credentials (e.g., without prompting the user to log-in). The SSO service 155 may promote improved user experience (e.g., by limiting the number of credentials the user 185 has to remember/enter), enhanced security (e.g., by leveraging secure authentication protocols and centralized security policies), and reduced credential fatigue, among other benefits.

The MFA service 160 of the identity management system 120 may enhance the security of the computing system 100 by prompting the user 185 to provide multiple authentication factors before granting the user 185 access to applications 110. These authentication factors may include one or more knowledge factors (e.g., something the user 185 knows, such as a password), one or more possession factors (e.g., something the user 185 is in possession of, such as a mobile app-generated code or a hardware token), or one or more inherence factors (e.g., something inherent to the user 185, such as a fingerprint or other biometric information). In some implementations, the MFA service 160 may be used in conjunction with the SSO service 155. For example, the user 185 may provide the requested login credentials to the identity management system 120 in accordance with an SSO flow and, in response, the identity management system 120 may prompt the user 185 to provide a second factor, such as a possession factor (e.g., a one-time passcode (OTP), a hardware token, a text message code, an email link/code). The user 185 may obtain access (e.g., be granted access by the identity management system 120) to the requested applications 110 based on successful verification of both the first authentication factor and the second authentication factor.

The API service 165 of the identity management system 120 can secure APIs by managing access tokens and API keys for various client organizations, which may enable (e.g., only enable) authorized applications (e.g., one or more of the applications 110) and authorized users (e.g., the user 185) to interact with a client organization's APIs. The API service 165 may enable client organizations to implement customizable login experiences that are consistent with their architecture, brand, and security configuration. The API service 165 may enable administrators to control user API access (e.g., whether the user 185 and/or one or more other users have access to one or more particular APIs). In some examples, the API service 165 may enable administrators to control API access for users via authorization policies, such as standards-based authorization policies that leverage OAuth 2.0. The API service 165 may additionally, or alternatively, implement role-based access control (RBAC) for applications 110. In some implementations, the API service 165 can be used to configure user lifecycle policies that automate API onboarding and off-boarding processes.

The directory management service 170 may enable the identity management system 120 to integrate with various identity sources of client organizations. In some implementations, the directory management service 170 may communicate with a directory service 145 of the on-premises system 115 via a software agent 150 installed on one or more computers, servers, and/or devices of the on-premises system 115. Additionally, or alternatively, the directory management service 170 may communicate with one or more other directory services, such as one or more cloud-based directory services. As described herein, a software agent 150 generally refers to a software program or component that operates on a system or device (such as a device of the on-premises system 115) to perform operations or collect data on behalf of another software application or system (such as the identity management system 120).

The provisioning service 175 of the identity management system 120 may support user provisioning and deprovisioning. For example, in response to an employee joining a client organization, the identity management system 120 may automatically create accounts for the employee and provide the employee with access to one or more resources via the accounts. Similarly, in response to the employee (or some other employee) leaving the client organization, the identity management system 120 may autonomously deprovision the employee's accounts and revoke the employee's access to the one or more resources (e.g., with little to no intervention from the client organization). The provisioning service 175 may maintain audit logs and records of user deprovisioning events, which may help the client organization demonstrate compliance and track user lifecycle changes. In some implementations, the provisioning service 175 may enable administrators to map user attributes and roles (e.g., permissions, privileges) between the identity management system 120 and connected applications 110, ensuring that user profiles are consistent across the identity management system 120, the on-premises system 115, and the cloud system 125.

Although not depicted in the example of FIG. 1, a person skilled in the art would appreciate that the identity management system 120 may support or otherwise provide access to any number of additional or alternative services, applications 110, platforms, providers, or the like. In other words, the functionality of the identity management system 120 is not limited to the exemplary components and services mentioned in the preceding description of the computing system 100. The description herein is provided to enable a person skilled in the art to make or use the present disclosure. Various modifications to the present disclosure will be readily apparent to those skilled in the art, and the generic principles defined herein may be applied to other variations without departing from the scope of the present disclosure. Accordingly, the present disclosure is not limited to the examples and designs described herein, but is to be accorded the broadest scope consistent with the principles and novel features disclosed herein.

The identity management system 120 may manage sessions for a target client and/or a source client. For example, the identity management system 120 may support SSO with an inter-client token. That is, the identity management system 120 may provide an identity token to the source client after performing an authorization procedure to establish a session. The source client transmit the identity token (e.g., and other information that may indicate that the session is portable) to a target client. For example, the source client may generate an inter-client token based on the identity token and transmit the inter-client token to the target client to be used to establish another session. The identity token, the inter-client token, or both, may include an indication of authentication methods associated with the authorization procedure performed via the identity management system 120 and a cryptographic signature of the identity management system 120. For example, if the authentication methods associated with the authorization procedure satisfy authentication requirements at the target client, the target client may establish the session. Additionally, or alternatively, the target client may be associated with the identity management system 120 or a different authorization server. In some examples, the target client may establish the session based on the identity management system 120 and the authorization server having a trust relationship.

Figure 2:
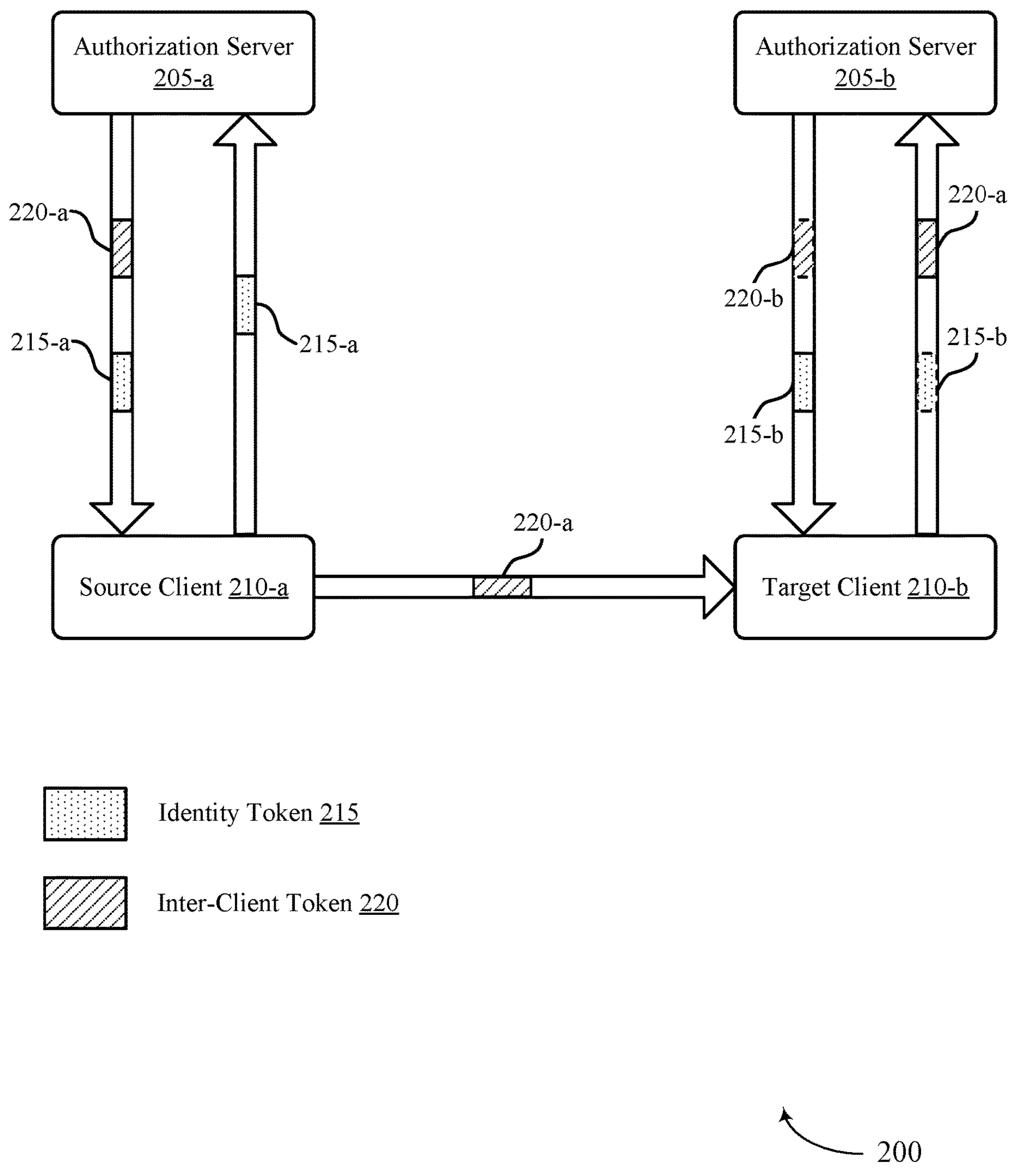

FIG. 2 shows an example of a computing system 200 that supports techniques for inter-client authorization in accordance with aspects of the present disclosure. In some examples, the computing system 200 may implement or be implemented by aspects of the computing system 100. For example, the computing system 200 may include an authorization server 205-*a* and an authorization server 205-*b* which may be examples of the identity management system 120 as described with reference to FIG. 1.

The authorization server 205-*a*, a source client 210-*a*, a target client 210-*b*, and the authorization server 205-*b* may support a token exchange in which one or multiple tokens may be exchanged to facilitate session continuation for a user across multiple clients. For example, the user may perform an authorization procedure via the authorization server 205-*a* to establish a session at the source client 210-*a*. During the session, the authorization server 205-*a* may provide one or more tokens, such as an identity token 215-*a* to the source client 210-*a*. The source client 210-*a* may transmit an inter-client token 220-*a* to the target client 210-*b*, which may be exchanged with the authorization server 205-*b* to establish a session (e.g., without necessitating that the user sign-in again). That is, the user may transition the session with the source client 210-*a* to a session with the target client 210-*b* without performing an additional authorization procedure.

During the authorization procedure at the source client 210-*a* (e.g., via the authorization server 205-*a*), the source client 210-*a* may authorize the user against the authorization server 205-*a* using the authorization procedure (e.g., OAuth2 or another type of authorization procedure that may be capable of generating the inter-client token and signing the inter-client token using a key trusted by the target authorization server). For example, the source client 210-*a* may authorize the user via an authorization code flow, an interaction code flow, a direct authorization, or the like. In some examples, the source client 210-*a* may perform the authorization procedure via the authorization server 205-*a* as part of a login procedure for the user at the source client 210-*a*. In other words, the user may request to access or login to a user account at the source client 210-*a*, and the source client 210-*a* may verify an authorization of the user to access or login to the user account via the authorization server 205-*a*.

After the user is authorized, the authorization server 205-*a* may transmit the identity token 215-*a* (e.g., and one or more other tokens) to the source client 210-*a*. For example, the identity token 215-*a* may represent the identity of the user and/or that the identity of the user has been validated by the authorization server 205-*a*. The one or more other tokens (e.g., in addition to the identity token 215-*a*) received at the source client 210-*a* after the authorization procedure may include a session token, an access token, and/or a refresh token. For example, the refresh token may be used to retrieve a new access token after expiry of the access token. Additionally, or alternatively, the source client 210-*a* may receive a client SSO secret and/or an indication of a token type. In some examples, the identity token 215-*a* may be signed (e.g., cryptographically signed) by the authorization server 205-*a*. That is, the identity token 215-*a* may include an indication of an issuer that may not be changed.

The identity token 215-*a* may be a JavaScript™ Object Notation (JSON) web token (JWT). For example, the identity token 215-*a* may include a header, a payload, and a signature of the header and the payload. The signature may be used to validate the header and payload. For example, because the signature represents an encoded version of the header and the payload, if the header or payload were to be modified, the signature would be invalid. In other words, a recipient of the identity token 215-*a*, such as the authorization server 205-*b* or the target client 210-*b*, may verify an authenticity of the header and the payload of the identity token 215-*a* by performing a cryptographic signature validation process. For example, the target client 210-*b* may generate, using a public key referenced in the header of the identity token 215-*a*, the signature and compare the generated signature to the signature of the identity token 215-*a*.

In some examples, the identity token 215-*a* may include multiple indications. For example, the identity token 215-*a* may include indications of an issuer of the identity token 215-*a* (e.g., an indication of the authorization server 205-*a*), a subject (e.g., an identifier of the user, such as a user ID), an audience (e.g., the source client 210-*a* or the target client 210-*b*), a time at which the identity token 215-*a* was issued, a time at which the identity token 215-*a* expires, or the like. Additionally, or alternatively, the identity token 215-*a* may include an authentication methods reference (AMR). For example, the AMR may include a list of methods that the user was authenticated with via the authentication procedure with the authorization server 205-*a*. As an example, if the user authenticated an identity via a password, email verification, and/or short messaging service (SMS) verification, the AMR would indicate that the user is authenticated via password, email, and SMS.

To generate the inter-client token 220-*a*, the source client 210-*a* may exchange the identity token 215-*a*. For example, the user may trigger an exchange of the identity token 215-*a* for the inter-client token 220-*a*. In other words, the source client 210-*a* may transmit the identity token 215-*a* to the authorization server 205-*a* in order to receive the inter-client token 220-*a* based on a user operation at the source client 210-*a*. As an example, a user may make a selection at the source client 210-*a* to access a portion of a server (e.g., a server supporting the source client 210-*a*) via the target client 210-*b*. For example, the source client 210-*a* may be a web application while the target client 210-*b* may be a native application on a user device (e.g., the same device or another device, which may be supported by a same server), and the selection may be to open the native application. In some examples, in accordance with the token exchange flow used to create the inter-client token 220-*a*, the authorization server 205-*a* may use the identity token 215-*a* (e.g., in combination with the access token) to validate the identity of the user and to generate the inter-client token 220-*a*.

After receiving the identity token 215-*a*, the authorization server 205-*a* may provide the inter-client token 220-*a* to the source client 210-*a*. The inter-client token 220-*a* may be a one-time use token. For example, the authorization server 205-*b* (e.g., or, generally, an authorization server receiving an inter-client token) may store an identifier of the inter-client token 220-*a* such that it may not be exchanged again. Additionally, or alternatively, the authorization server 205-*a* (e.g., or, generally an authorization server issuing an inter-client token) may validate whether or not the inter-client token 220-*a* is used via an API endpoint.

The inter-client token 220-*a* may be cryptographically signed by the authorization server 205-*a*. For example, the authorization server 205-*a* may cryptographically sign the inter-client token 220-*a* via a public key. The public key may be accessible to (e.g., known by, publicly available to) other authorization servers, including the authorization server 205-*b*, such that the authorization server 205-*b* may verify the signature using the public key. For example, the authorization server 205-*b* may validate the cryptographic signature of the inter-client token 220-*a* against public keys of the authorization server 205-*a*, where the public keys may be accessed via a JSON web key sets (JWKS) discovery URL.

Additionally, or alternatively, the inter-client token 220-*a* may include an indication of the user ID (e.g., a subject), a time of creation, a duration before or a time at which the inter-client token 220-*a* expires, information associated with the target client 210-*b*, and/or the AMR. The inter-client token 220-*a* may be valid for a shorter duration than the identity token 215-*a*. For example, the authorization server 205-*a* may set the expiration of the inter-client token 220-*a* such that it may be used to establish a session at the target client 210-*b* for a relatively short duration after being received from the source client 210-*a* and not thereafter. In some examples, the inter-client token 220-*a* may be a JWT (e.g., an unencrypted JWT) or a JSON web encryption (JWE) token.

After receiving the inter-client token 220-*a* from the authorization server 205-*a*, the source client 210-*a* may transmit the inter-client token 220-*a* to the target client 210-*b*. For example, the source client 210-*a* may transmit the inter-client token 220-*a* to the target client 210-*b* via a URL redirect, an application deep link, a BLUETOOTH link, a near field communication (NFC) app-to-app exchange, a quick response (QR) code, a local transmission control protocol (TCP) or internet protocol (IP), or the like. In other words, the source client 210-*a* may transmit the inter-client token 220-*a* to the target client 210-*b* via various methods.

The target client 210-*b* may use the inter-client token 220-*a* to establish a session via the authorization server 205-*b*. For example, the target client 210-*b* may transmit the inter-client token 220-*a* to the authorization server 205-*b* as a login hint. In other words, the target client 210-*b* may transmit the inter-client token 220-*a* to the authorization server 205-*b* as login information (e.g., a login hint, a username and/or password, etc.). The authorization server 205-*b* may receive the inter-client token 220-*a* as the login information and determine that the login information includes a token (e.g., a valid token). Based on determining that the login information includes the token, the authorization server 205-*b* may exchange the inter-client token 220-*a* for an identity token 215-*b* (e.g., a new identity token). That is, the authorization server 205-*b* may respond to receiving the inter-client token 220-*a* by establishing the session via the target client 210-*b* and/or by transmitting the identity token 215-*b* to the target client 210-*b*.

In some examples, the target client 210-*b* may use the inter-client token 220-*a* to initiate an SAML authentication session (e.g., for a legacy system) based on values of the inter-client token 220-*a*. Or, in some other examples, the target client 210-*b* may use the inter-client token 220-*a* via an intermediary system if, for example, the authorization server 205-*b* does not have a capability to decrypt or otherwise process the inter-client token 220-*a*. That is, the user may use a first authorization procedure (e.g., OAuth2) to establish the session with the source client 210-*a* (e.g., and obtain the identity token 215-*a*) and may use a second authorization procedure (e.g., a same type of authorization procedure, a different type of authorization procedure, such as for a legacy authentication system that may not be OAuth2- or MFA-enabled) to establish the session with the target client 210-*b*. Or, the intermediary system may generate the inter-client token 220-*a* if, for example, the source client 210-*a* or the authorization server 205-*a* does not have a capability to generate the inter-client token 220-*a*.

The identity token 215-*b* may represent the identity of the user and/or indicate that the identity of the user has been validated by the authorization server 205-*b*. The target client 210-*b* may receive (e.g., in addition to the identity token 215-*b*) one or more tokens including a session token, an access token, and/or a refresh token. The identity token 215-*b* may be signed (e.g., cryptographically signed) by the authorization server 205-*b*. That is, the identity token 215-*b* may include an indication of an issuer that may not be changed.

The identity token 215-*b* may be a JWT and, in some examples, the identity token 215-*b* may include multiple indications. For example, the identity token 215-*b* may include indications of an issuer (e.g., an indication of the authorization server 205-*b*), a subject, an audience, a time at which the identity token 215-*b* was issued, a time at which the identity token 215-*b* expires, an AMR, or the like. The AMR may include a list of methods that the user was authenticated with via the authentication procedure with the authorization server 205-*a* at the source client 210-*a*. In some examples, the authorization server 205-*b* or the target client 210-*b* may be associated with different authentication methods than the authorization server 205-*a* or the source client 210-*a*. In such examples, the AMR may include the authentication methods performed via both the authorization server 205-*a* and the authorization server 205-*b*.

As an example, the authentications at the source client 210-*a* may include the password, email, and SMS verifications while the authentications at the target client 210-*b* may include a password, email, SMS, and biometric verifications. Because the user completed the password, email, and SMS verifications at the source client 210-*a* as indicated by the AMR, the user may complete the biometric verification via the authorization server 205-*b* at the target client 210-*b*. After completing the biometric verification, the AMR may be updated to include the password, email, SMS, and biometric verifications. Alternatively, if the authentications at the target client 210-*b* include only a password, the user may not complete any additional authentication via the authorization server 205-*b*.

In some examples, the target client 210-*b* may exchange the inter-client token 220-*a* to establish a session via the authorization server 205-*b* based on a trust relationship between the authorization server 205-*a* and the authorization server 205-*b*. For example, the authorization server 205-*b* may validate the cryptographic signature of the authorization server 205-*a* on the inter-client token 220-*a* against the public keys of the authorization server 205-*a* if the authorization server 205-*b* trusts the authorization server 205-*a*. As an example, the authorization server 205-*b* may validate the cryptographic signature on the inter-client token 220-*a* based on having a trust relationship with the authorization server 205-*a* or refrain from validating the cryptographic signature based on not having the trust relationship with the authorization server 205-*a*. That is, the authorization server 205-*b* may reject the inter-client token 220 if the authorization server 205-*b* lacks a trust relationship with the authorization server 205-*a*. For example, the authorization server 205-*b* may request the target client 210-*b* to verify the identity of the user based on rejecting the inter-client token 220.

The target client 210-*b* may exchange the identity token 215-*b* for an inter-client token 220-*b*. For example, a user operation at the target client 210-*b* may trigger an exchange of the identity token 215-*b* for the inter-client token 220-*b*, where the inter-client token 220-*b* may be used to establish a session at the source client 210-*a* or a different client.

While depicted as being separate servers in the example of FIG. 2, the authorization server 205-*a* and the authorization server 205-*b* may correspond to the same authorization server. For example, the same authorization server may support the source client 210-*a* and the target client 210-*b*. Accordingly, when the source client 210-*a* and the target client 210-*b* are supported by the same authorization server, the inter-client token 220-*a* may be accepted at the target client 210-*b*. The identity management system 120 may be an example of or include an authorization server. Additionally, or alternatively, the source client 210-*a* and the target client 210-*b* may be respective subsets of a same client. As an example, the source client 210-*a* may be a web application of a client (e.g., a device) while the target client 210-*b* may be a native application of the client (or vice versa). Additionally, or alternatively, the source client 210-*a* may be an application (e.g., a web application, a native application) of a first client (e.g., a first device, such as a desktop computer) and the source client 210-*a* may be another application (e.g., another web application, another native application) of a second client (e.g., a second device, such as a mobile phone or other type of mobile device).

Figure 3:
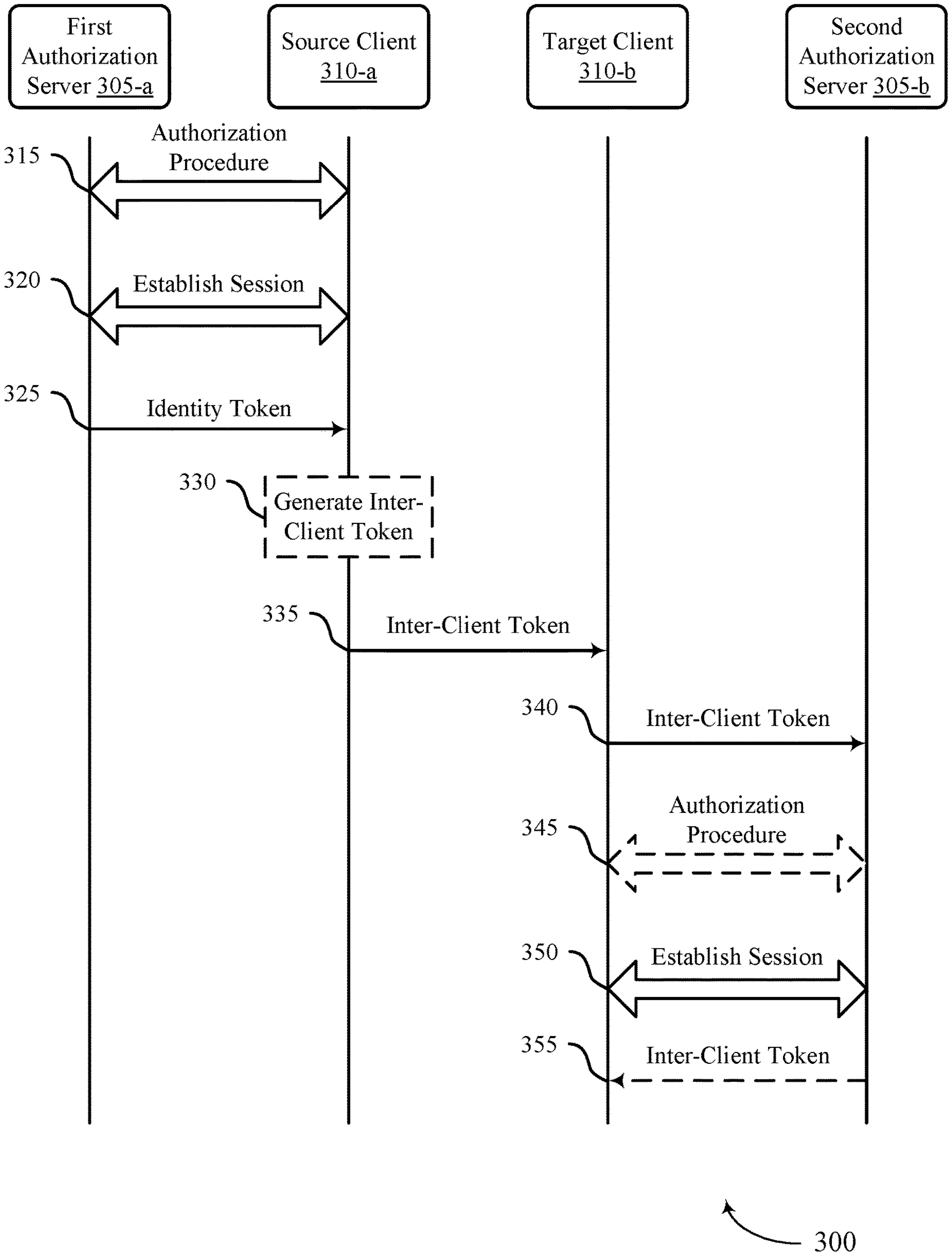
FIG. 3 shows an example of a process flow that supports techniques for inter-client authorization in accordance with aspects of the present disclosure.

FIG. 3 shows an example of a process flow 300 that supports techniques for inter-client authorization in accordance with aspects of the present disclosure. In some examples, the process flow 300 may implement aspects of the computing system 100, the computing system 200, or both. The process flow 300 may illustrate operations of a first authorization server 305-*a*, a source client 310-*a*, a target client 310-*b*, and a second authorization server 305-*b*, which may be examples of corresponding devices as described with reference to FIGS. 1 and 2. For example, the first authorization server 305-*a* and the second authorization server 305-*b* may be examples of the identity management system 120 as described with reference to FIG. 1 and the authorization server 205-*a* or the authorization server 205-*b* as described with reference to FIG. 2. Additionally, the source client 310-*a* and the target client 310-*b* may be examples of the source client 210-*a* and the target client 210-*b* as described with reference to FIG. 2.

In the following description of the process flow 300, the operations performed at the first authorization server 305-*a*, the source client 310-*a*, the target client 310-*b*, and the second authorization server 305-*b* may be performed in different orders or at different times than shown. Additionally, or alternatively, some operations may be omitted from the process flow 300 and other operations may be added to the process flow 300.

At 315, the source client 310-*a* may perform a first authorization procedure via the first authorization server 305-*a*. For example, the source client 310-*a* may perform the first authorization procedure at 315 to establish a first session at 320 for a user at the source client 310-*a*.

At 325, the source client 310-*a* may receive, from the first authorization server 305-*a* and based at least in part on the first authorization procedure, an identity token including an identifier of the user and an indication of authentication methods (e.g., an AMR) associated with the first authorization procedure at 315. For example, the indication of authentication methods may include a list of values associated with the authentication methods. In some examples, the source client 310-*a* may receive the identity token based on a user operation at the source client 310-*a*. Additionally, or alternatively, the source client 310-*a* may receive a session token, an access token, and/or a refresh token (e.g., in addition to the identity token). The identity token may be cryptographically signed by the first authorization server 305-*a*.

At 330, the source client 310-*a* may generate an inter-client token based on the identity token received at 325. The inter-client token may include the identifier of the user and the indication of the authentication methods (e.g., the AMR). Additionally, or alternatively, the inter-client token may be cryptographically signed by the first authorization server 305-*a*. In some examples, generating the inter-client token may include exchanging the identity token with the first authorization server 305-*a* for the inter-client token. For example, a user operation at the source client 310-*a* may trigger the exchange of the identity token for the inter-client token. The inter-client token may include an indication of an expiration, an identifier of the inter-client token to be stored at the second authorization server 305-*b* after use of the inter-client token, and/or an identifier of the target client 310-*b*. In some examples, the inter-client token may be a single-use token.

At 335, the source client 310-*a* may transmit, to the target client 310-*b*, the inter-client token that is based on the identity token received at 325. In some examples, the source client 310-*a* may transmit the inter-client token to the target client 310-*b* based on generating the inter-client token at 330. The inter-client token may be usable for establishing a second session for the user at the target client 310-*b*. The source client 310-*a* may transmit the inter-client token to the target client 310-*b* via a URL redirect, an application deep link, a BLUETOOTH link, an NFC app-to-app exchange, a QR code, a local TCP or IP, or the like.

At 340, the target client 310-*b* may transmit the inter-client token to the second authorization server 305-*b*. For example, the target client 310-*b* may transmit the inter-client token to the second authorization server 305-*b* to establish a session for the user via a second authorization procedure.

At 345, the target client 310-*b* may perform the second authorization procedure for the user via the second authorization server 305-*b*. For example, the target client 310-*b* may receive, from the second authorization server 305-*b*, a request to verify an identity of the user via an authentication method. The target client 310-*b* may receive the request based on an assurance level associated with the first set of authentication methods failing to satisfy a threshold level of assurance associated with the second authorization procedure. As an example, the first set of authentication methods may involve a password verification while the second authorization procedure may involve a password and an SMS verification. That is, the second authorization server 305-*b* may request the user to perform SMS verification.

At 350, the target client 310-*b* may establish a session for the user via the second authorization procedure between the target client 310-*b* and the second authorization server 305-*b*. In some examples, establishing the session for the user at the target client 310-*b* may be based on successfully verifying the identity of the user via the authentication method at 345. Additionally, or alternatively, establishing the session may be based on the signature included in the inter-client token being valid. For example, the second authorization server 305-*b* may verify a validity of the signature before establishing the session. In some examples, establishing the session may be based on a trust relationship between the first authorization server 305-*a* and the second authorization server 305-*b*. For example, the second authorization server 305-*b* may receive the inter-client token and verify the signature based on the trust relationship or, in some other examples, reject the token and request an authorization procedure (e.g., the authorization procedure at 345).

At 355, the target client 310-*b* may receive a second inter-client token from the second authorization server 305-*b*. For example, the target client 310-*b* may receive the second inter-client token in response to a user operation at the target client 310-*b*. The second inter-client token may include the identifier of the user and an indication of a second set of authentication methods (e.g., an AMR). The second set of authentication methods may be associated with the first authorization procedure and the second authorization procedure. That is, the second set of authentication methods may include the authentication methods performed via the first authorization server 305-*a* and the second authorization server 305-*b*.

In some examples, the source client 310-*a* may be a first application on a first device and the target client 310-*b* may be a second application on the first device or a second device. That is, the source client 310-*a* and the target client 310-*b* may be on a same device or different devices. As an example, the source client 310-*a* may be a web application while the target client 310-*b* may be a native application. That is, the first application may be a first type of application and the second application may be a second type of application different than the first type of application.

Figure 4:
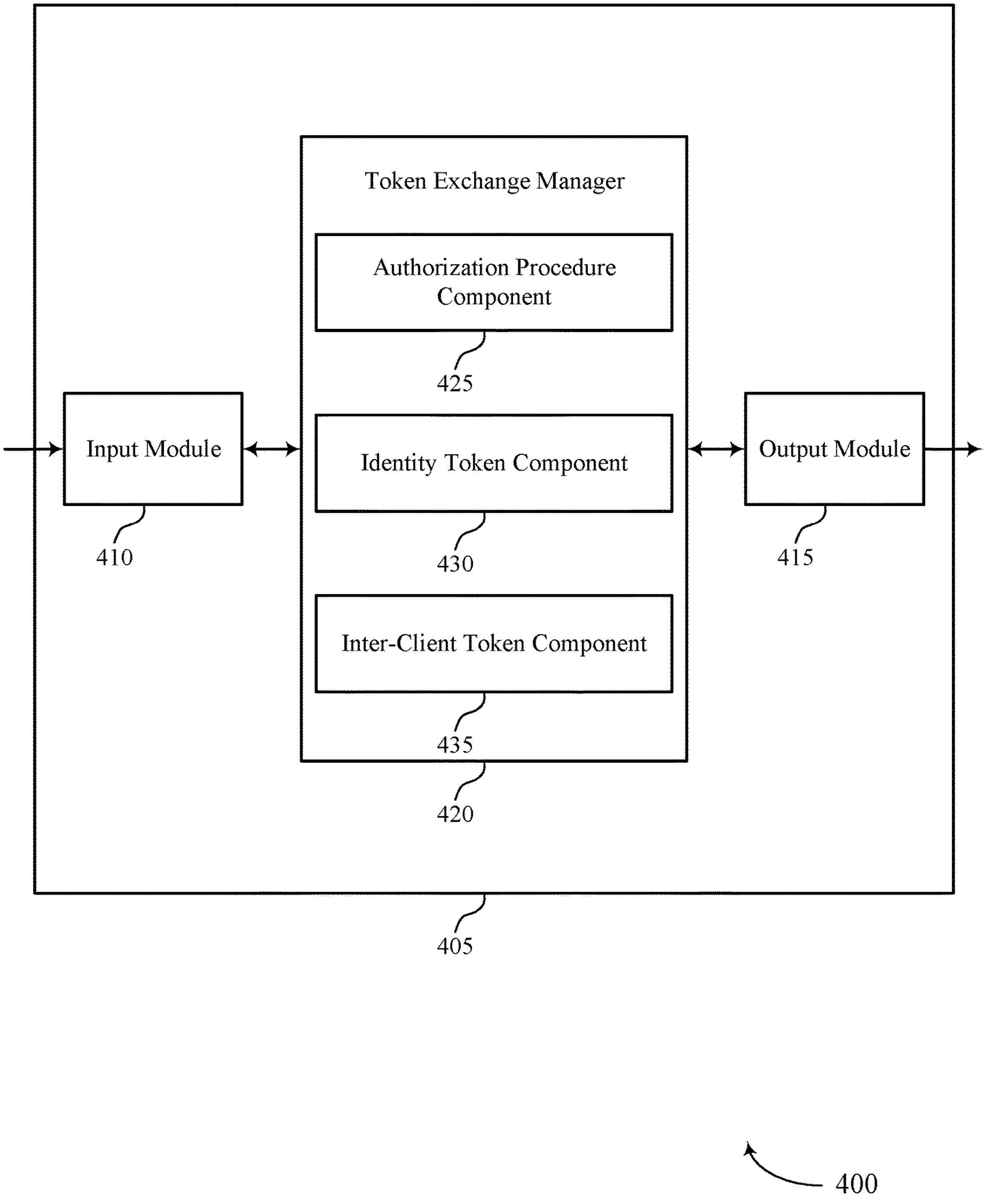
FIG. 4 shows a block diagram of an apparatus that supports techniques for inter-client authorization in accordance with aspects of the present disclosure.

FIG. 4 shows a block diagram 400 of a device 405 that supports techniques for inter-client authorization in accordance with aspects of the present disclosure. The device 405 may include an input module 410, an output module 415, and a token exchange manager 420. The device 405, or one or more components of the device 405 (e.g., the input module 410, the output module 415, the token exchange manager 420), may include at least one processor, which may be coupled with at least one memory, to support the described techniques. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the token exchange manager 420 to support techniques for inter-client authorization. In some cases, the input module 410 may be a component of an input/output (I/O) controller 610 as described with reference to FIG. 6.

The output module 415 may manage output signals for the device 405. For example, the output module 415 may receive signals from other components of the device 405, such as the token exchange manager 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the token exchange manager 420 may include an authorization procedure component 425, an identity token component 430, an inter-client token component 435, or any combination thereof. In some examples, the token exchange manager 420, or various components thereof, may be configured to perform various operations (e.g., receiving, monitoring, transmitting) using or otherwise in cooperation with the input module 410, the output module 415, or both. For example, the token exchange manager 420 may receive information from the input module 410, send information to the output module 415, or be integrated in combination with the input module 410, the output module 415, or both to receive information, transmit information, or perform various other operations as described herein.

The token exchange manager 420 may support establishing sessions via one or more authorization servers in accordance with examples as disclosed herein. The authorization procedure component 425 may be configured to support performing a first authorization procedure to establish a first session for a user at a source client, the first authorization procedure being performed via a first authorization server of the one or more authorization servers. The identity token component 430 may be configured to support receiving, from the first authorization server based on the first authorization procedure, an identity token including at least an identifier of the user and an indication of one or more authentication methods associated with the first authorization procedure. The inter-client token component 435 may be configured to support transmitting, to a target client, an inter-client token that is based on the identity token, where the inter-client token is usable for establishing a second session for the user at the target client.

Figure 5:
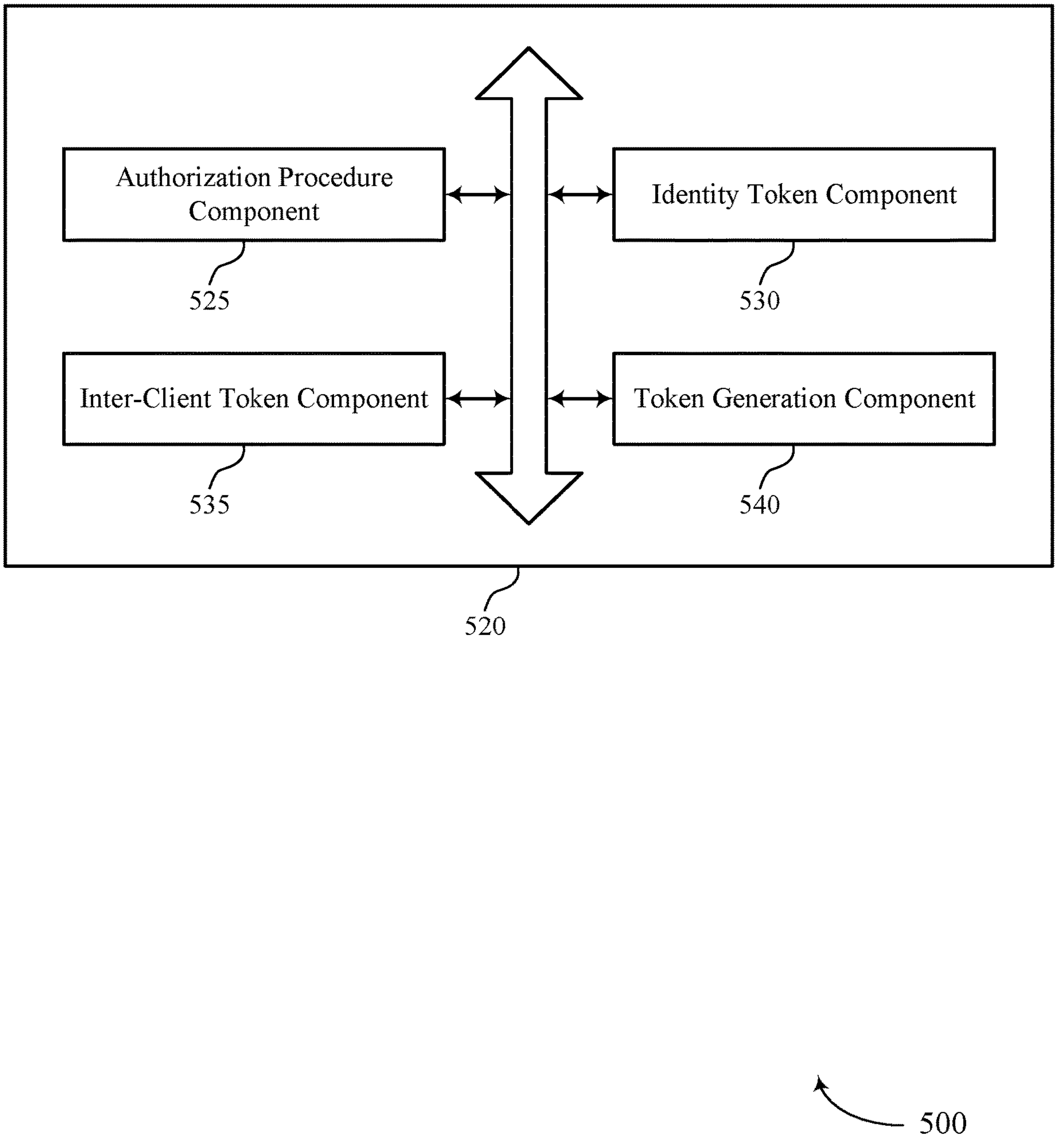
FIG. 5 shows a block diagram of a token exchange manager that supports techniques for inter-client authorization in accordance with aspects of the present disclosure.

FIG. 5 shows a block diagram 500 of a token exchange manager 520 that supports techniques for inter-client authorization in accordance with aspects of the present disclosure. The token exchange manager 520 may be an example of aspects of a token exchange manager or a token exchange manager 420, or both, as described herein. The token exchange manager 520, or various components thereof, may be an example of means for performing various aspects of techniques for inter-client authorization as described herein. For example, the token exchange manager 520 may include an authorization procedure component 525, an identity token component 530, an inter-client token component 535, a token generation component 540, or any combination thereof. Each of these components, or components of sub-components thereof (e.g., one or more processors, one or more memories), may communicate, directly or indirectly, with one another (e.g., via one or more buses).

The token exchange manager 520 may support establishing sessions via one or more authorization servers in accordance with examples as disclosed herein. The authorization procedure component 525 may be configured to support performing a first authorization procedure to establish a first session for a user at a source client, the first authorization procedure being performed via a first authorization server of the one or more authorization servers. The identity token component 530 may be configured to support receiving, from the first authorization server based on the first authorization procedure, an identity token including at least an identifier of the user and an indication of one or more authentication methods associated with the first authorization procedure. The inter-client token component 535 may be configured to support transmitting, to a target client, an inter-client token that is based on the identity token, where the inter-client token is usable for establishing a second session for the user at the target client.

In some examples, the token generation component 540 may be configured to support generating the inter-client token based on the identity token, where transmitting the inter-client token is in accordance with the generating and where the inter-client token includes at least the identifier of the user and the indication of the one or more authentication methods.

In some examples, to support receiving the identity token, the identity token component 530 may be configured to support receiving the identity token based on a user operation at the source client.

In some examples, to support receiving the identity token, the identity token component 530 may be configured to support receiving the identity token and one or more of a session token, an actor token, or a refresh token based on the user operation at the source client.

In some examples, the inter-client token further includes one or more of an indication of an expiration of the inter-client token, an identifier of the inter-client token to be stored at a second authorization server after use of the inter-client token, or an identifier of the target client.

In some examples, the identity token includes a signature based on the identity token being cryptographically signed via the first authorization server, and where establishing the second session is based on the signature being valid.

In some examples, the indication of the one or more authentication methods includes a set of multiple values associated with the one or more authentication methods.

In some examples, the inter-client token includes a one-time use token.

In some examples, to support transmitting the inter-client token to the target client, the inter-client token component 535 may be configured to support transmitting the inter-client token to the target client via a URL redirect, an application deep link, a BLUETOOTH link, a NFC app-to-app exchange, a QR code, a local TCP or IP, or any combination thereof.

In some examples, the inter-client token is usable for establishing the second session via the first authorization server or a second authorization server of the one or more authorization servers, and where the inter-client token is usable for establishing the second session according to the first authorization procedure or a second authorization procedure.

In some examples, the source client includes a first application on a first device and the target client includes a second application on the first device or a second device.

In some examples, the first application includes a first type of application and the second application includes a second type of application that is different from the first type of application.

Figure 6:
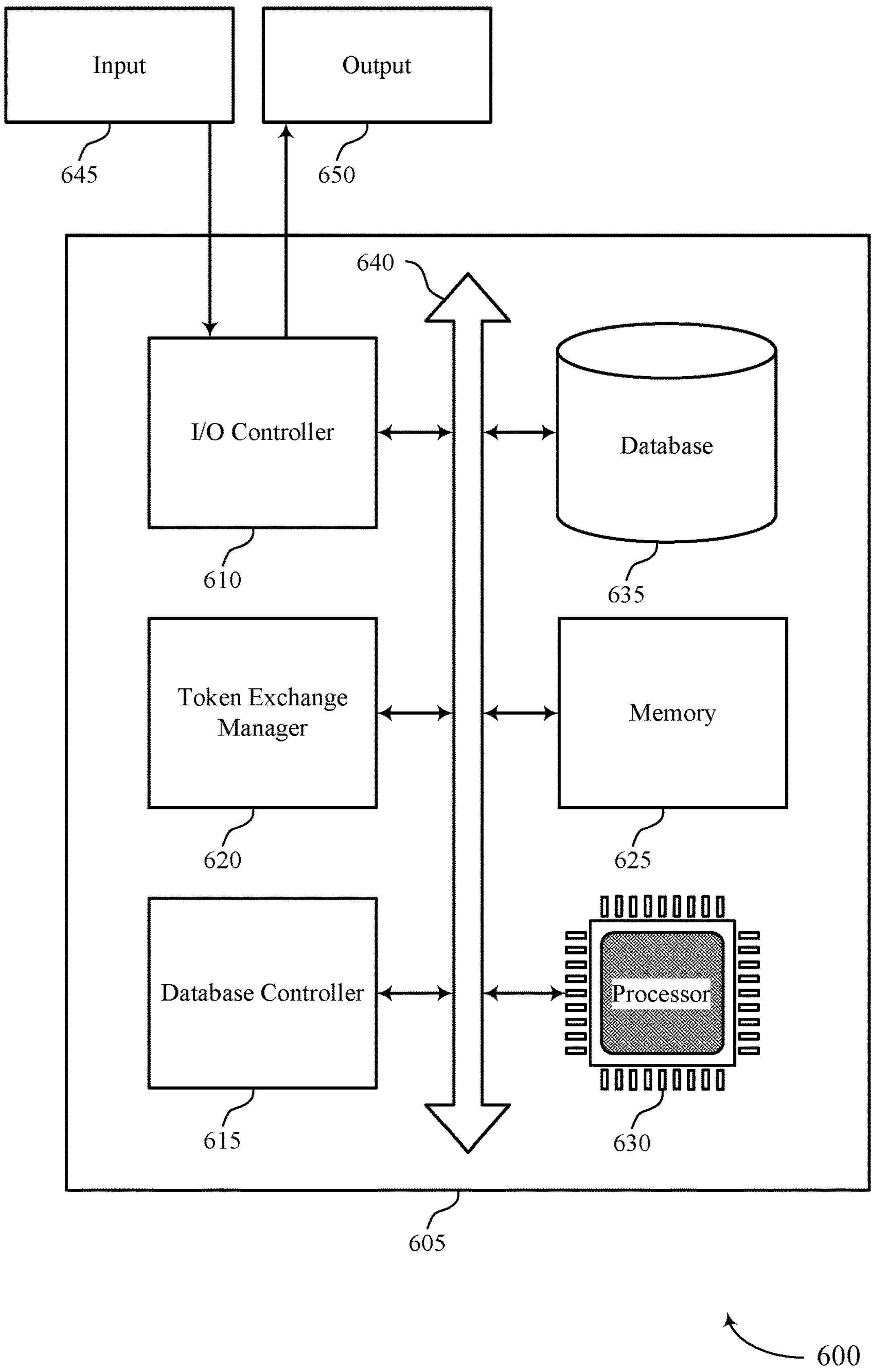
FIG. 6 shows a diagram of a system including a device that supports techniques for inter-client authorization in accordance with aspects of the present disclosure.

FIG. 6 shows a diagram of a system 600 including a device 605 that supports techniques for inter-client authorization in accordance with aspects of the present disclosure. The device 605 may be an example of or include components of a device 405 as described herein. The device 605 may include components for bi-directional voice and data communications including components for transmitting and receiving communications, such as a token exchange manager 620, an I/O controller, such as an I/O controller 610, a database controller 615, at least one memory 625, at least one processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and read-only memory (ROM). The memory 625 may store computer-readable, computer-executable software including instructions that, when executed, cause at least one processor 630 to perform various functions described herein. In some cases, the memory 625 may contain, among other things, a basic I/O system (BIOS) which may control basic hardware or software operation such as the interaction with peripheral components or devices. The memory 625 may be an example of a single memory or multiple memories. For example, the device 605 may include one or more memories 625.

The processor 630 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in at least one memory 625 to perform various functions (e.g., functions or tasks supporting techniques for inter-client authorization). The processor 630 may be an example of a single processor or multiple processors. For example, the device 605 may include one or more processors 630.

The token exchange manager 620 may support establishing sessions via one or more authorization servers in accordance with examples as disclosed herein. For example, the token exchange manager 620 may be configured to support performing a first authorization procedure to establish a first session for a user at a source client, the first authorization procedure being performed via a first authorization server of the one or more authorization servers. The token exchange manager 620 may be configured to support receiving, from the first authorization server based on the first authorization procedure, an identity token including at least an identifier of the user and an indication of one or more authentication methods associated with the first authorization procedure. The token exchange manager 620 may be configured to support transmitting, to a target client, an inter-client token that is based on the identity token, where the inter-client token is usable for establishing a second session for the user at the target client.

By including or configuring the token exchange manager 620 in accordance with examples as described herein, the device 605 may support techniques for improved user experience and improved security levels related to an SSO procedure.

Figure 7:
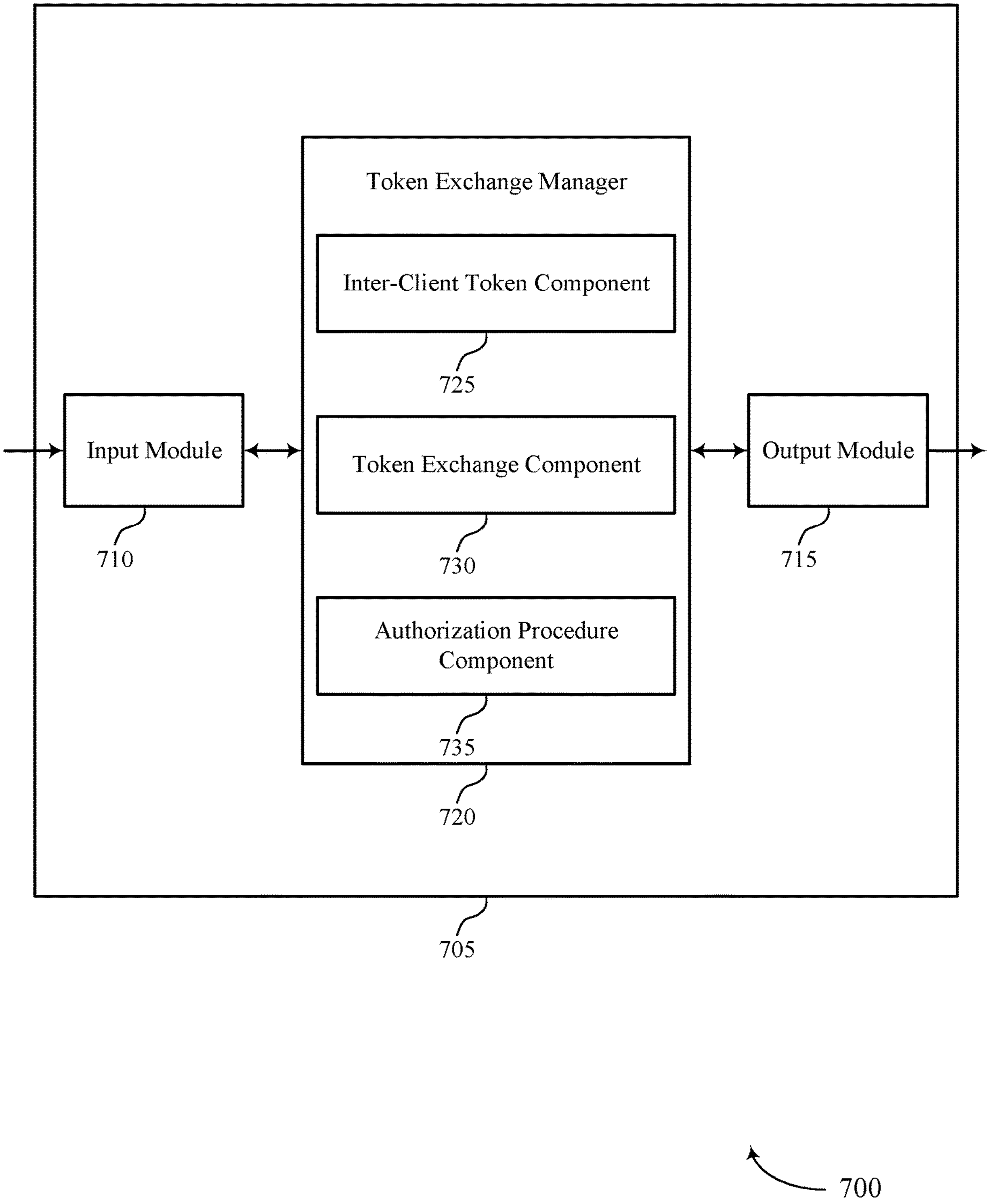
FIG. 7 shows a block diagram of an apparatus that supports techniques for inter-client authorization in accordance with aspects of the present disclosure.

FIG. 7 shows a block diagram 700 of a device 705 that supports techniques for inter-client authorization in accordance with aspects of the present disclosure. The device 705 may include an input module 710, an output module 715, and a token exchange manager 720. The device 705, or one or more components of the device 705 (e.g., the input module 710, the output module 715, the token exchange manager 720), may include at least one processor, which may be coupled with at least one memory, to support the described techniques. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the token exchange manager 720 to support techniques for inter-client authorization. In some cases, the input module 710 may be a component of an input/output (I/O) controller 910 as described with reference to FIG. 9.

The output module 715 may manage output signals for the device 705. For example, the output module 715 may receive signals from other components of the device 705, such as the token exchange manager 720, and may transmit these signals to other components or devices. In some examples, the output module 715 may transmit output signals for display in a user interface, for storage in a database or data store, for further processing at a server or server cluster, or for any other processes at any number of devices or systems. In some cases, the output module 715 may be a component of an I/O controller 910 as described with reference to FIG. 9.

For example, the token exchange manager 720 may include an inter-client token component 725, a token exchange component 730, an authorization procedure component 735, or any combination thereof. In some examples, the token exchange manager 720, or various components thereof, may be configured to perform various operations (e.g., receiving, monitoring, transmitting) using or otherwise in cooperation with the input module 710, the output module 715, or both. For example, the token exchange manager 720 may receive information from the input module 710, send information to the output module 715, or be integrated in combination with the input module 710, the output module 715, or both to receive information, transmit information, or perform various other operations as described herein.

The token exchange manager 720 may support establishing sessions via one or more authorization servers in accordance with examples as disclosed herein. The inter-client token component 725 may be configured to support receiving, from a source client, an inter-client token including at least an identifier of a user and an indication of a first set of authentication methods associated with a first authorization procedure between the source client and a first authorization server of the one or more authorization servers, where the inter-client token is usable for establishing a session for the user at a target client. The token exchange component 730 may be configured to support transmitting the inter-client token to a second authorization server of the one or more authorization servers. The authorization procedure component 735 may be configured to support establishing, based on the inter-client token, the session for the user at the target client and via the second authorization server, where the session is established in accordance with a second authorization procedure between the target client and the second authorization server.

Figure 8:
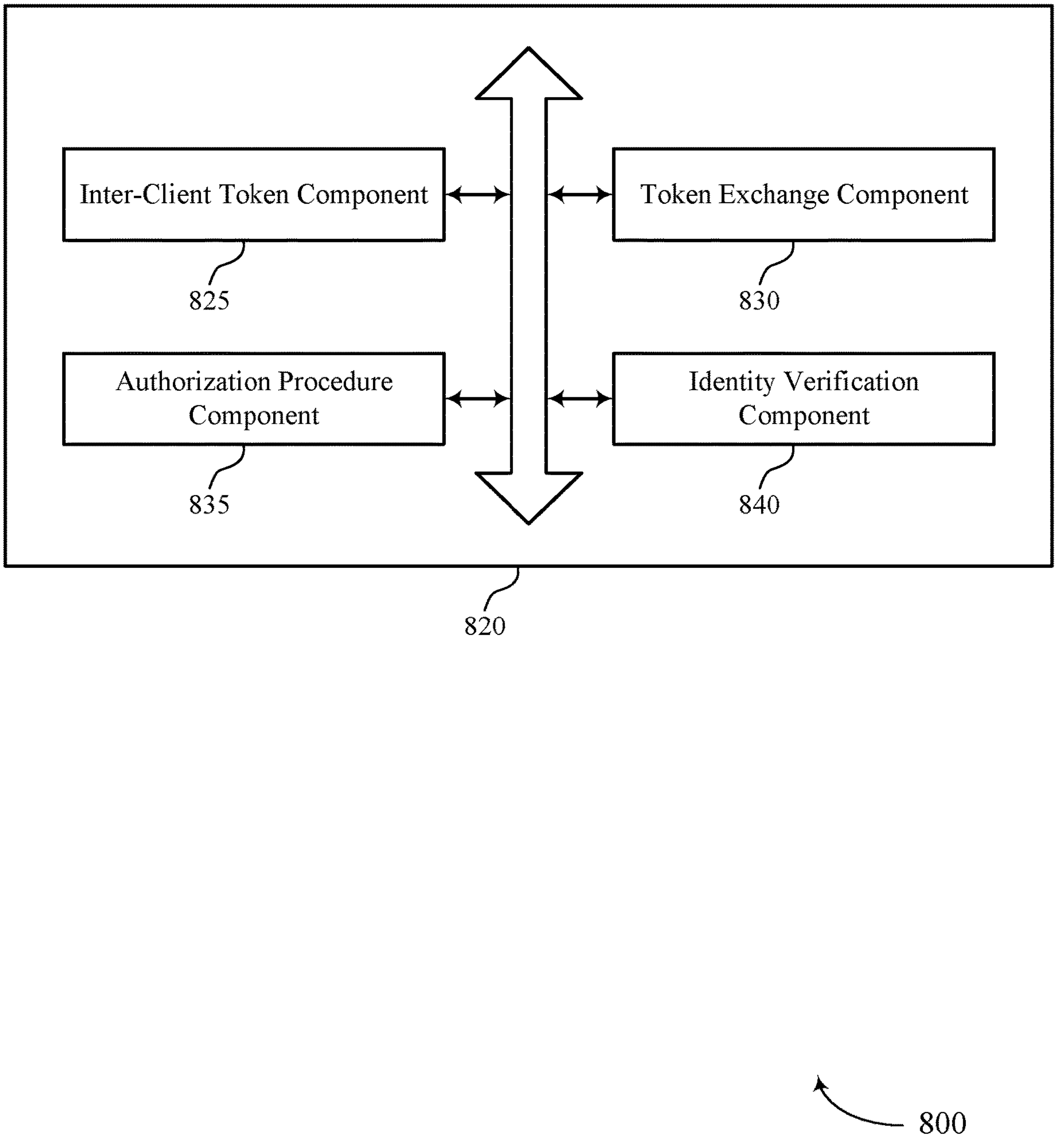
FIG. 8 shows a block diagram of a token exchange manager that supports techniques for inter-client authorization in accordance with aspects of the present disclosure.

FIG. 8 shows a block diagram 800 of a token exchange manager 820 that supports techniques for inter-client authorization in accordance with aspects of the present disclosure. The token exchange manager 820 may be an example of aspects of a token exchange manager or a token exchange manager 720, or both, as described herein. The token exchange manager 820, or various components thereof, may be an example of means for performing various aspects of techniques for inter-client authorization as described herein. For example, the token exchange manager 820 may include an inter-client token component 825, a token exchange component 830, an authorization procedure component 835, an identity verification component 840, or any combination thereof. Each of these components, or components of subcomponents thereof (e.g., one or more processors, one or more memories), may communicate, directly or indirectly, with one another (e.g., via one or more buses).

The token exchange manager 820 may support establishing sessions via one or more authorization servers in accordance with examples as disclosed herein. The inter-client token component 825 may be configured to support receiving, from a source client, an inter-client token including at least an identifier of a user and an indication of a first set of authentication methods associated with a first authorization procedure between the source client and a first authorization server of the one or more authorization servers, where the inter-client token is usable for establishing a session for the user at a target client. The token exchange component 830 may be configured to support transmitting the inter-client token to a second authorization server of the one or more authorization servers. The authorization procedure component 835 may be configured to support establishing, based on the inter-client token, the session for the user at the target client and via the second authorization server, where the session is established in accordance with a second authorization procedure between the target client and the second authorization server.

In some examples, the inter-client token component 825 may be configured to support receiving, from the second authorization server and in response to a user operation at the target client, a second inter-client token including at least the identifier of the user and an indication of a second set of authentication methods, where the second set of authentication methods is associated with the first authorization procedure and the second authorization procedure.

In some examples, the identity verification component 840 may be configured to support receiving, from the second authorization server, a request to verify an identity of the user via an authentication method, where receiving the request is based on an assurance level associated with the first set of authentication methods failing to satisfy a threshold level of assurance associated with the second authorization procedure, where establishing the session for the user at the target client is based on successfully verifying the identity of the user via the authentication method.

In some examples, the indication of the first set of authentication methods includes a set of multiple values associated with the first set of authentication methods.

In some examples, the inter-client token component 825 may be configured to support receiving, with the inter-client token, one or more of an indication of an expiration of the inter-client token, an identifier of the inter-client token to be stored at the second authorization server after use of the inter-client token, or an indication of the target client.

In some examples, the inter-client token includes a signature based on the inter-client token being cryptographically signed via the first authorization server, and where establishing the session is based on the signature being valid.

In some examples, the inter-client token includes a one-time use token.

In some examples, to support receiving the inter-client token from the source client, the inter-client token component 825 may be configured to support receiving the inter-client token from the source client via a URL redirect, an application deep link, a BLUETOOTH link, a NFC app-to-app exchange, a QR code, a local TCP or IP, or any combination thereof.

In some examples, establishing the session is further based on a trust relationship between the first authorization server and the second authorization server.

Figure 9:
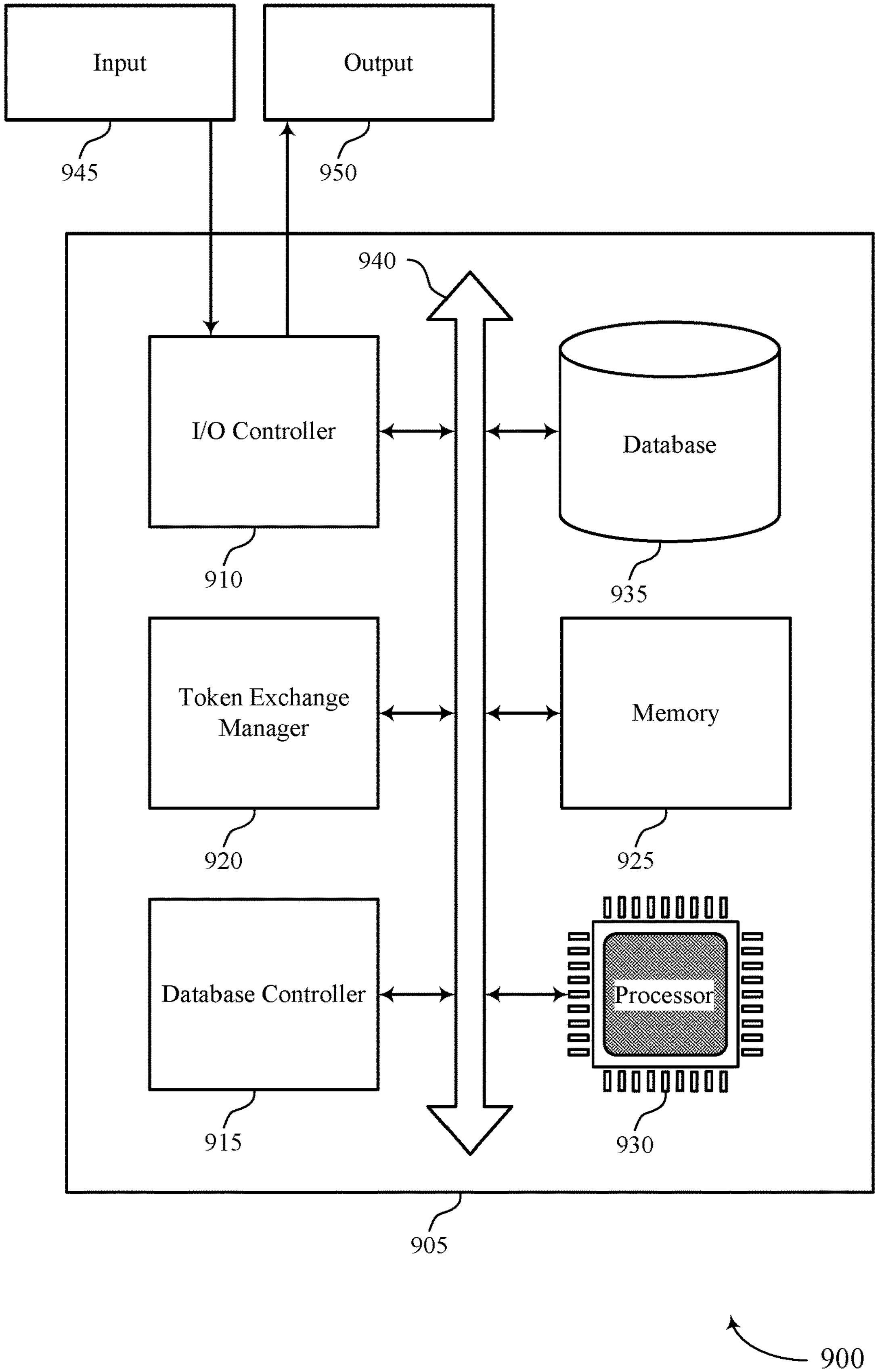
FIG. 9 shows a diagram of a system including a device that supports techniques for inter-client authorization in accordance with aspects of the present disclosure.

FIG. 9 shows a diagram of a system 900 including a device 905 that supports techniques for inter-client authorization in accordance with aspects of the present disclosure. The device 905 may be an example of or include components of a device 705 as described herein. The device 905 may include components for bi-directional voice and data communications including components for transmitting and receiving communications, such as a token exchange manager 920, an I/O controller, such as an I/O controller 910, a database controller 915, at least one memory 925, at least one processor 930, and a database 935. These components may be in electronic communication or otherwise coupled (e.g., operatively, communicatively, functionally, electronically, electrically) via one or more buses (e.g., a bus 940).

The I/O controller 910 may manage input signals 945 and output signals 950 for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. In other cases, the I/O controller 910 may represent or interact with a modem, a keyboard, a mouse, a touchscreen, or a similar device. In some cases, the I/O controller 910 may be implemented as part of a processor 930. In some examples, a user may interact with the device 905 via the I/O controller 910 or via hardware components controlled by the I/O controller 910.

The database controller 915 may manage data storage and processing in a database 935. In some cases, a user may interact with the database controller 915. In other cases, the database controller 915 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause at least one processor 930 to perform various functions described herein. In some cases, the memory 925 may contain, among other things, a basic I/O system (BIOS) which may control basic hardware or software operation such as the interaction with peripheral components or devices. The memory 925 may be an example of a single memory or multiple memories. For example, the device 905 may include one or more memories 925.

The processor 930 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in at least one memory 925 to perform various functions (e.g., functions or tasks supporting techniques for inter-client authorization). The processor 930 may be an example of a single processor or multiple processors. For example, the device 905 may include one or more processors 930.

The token exchange manager 920 may support establishing sessions via one or more authorization servers in accordance with examples as disclosed herein. For example, the token exchange manager 920 may be configured to support receiving, from a source client, an inter-client token including at least an identifier of a user and an indication of a first set of authentication methods associated with a first authorization procedure between the source client and a first authorization server of the one or more authorization servers, where the inter-client token is usable for establishing a session for the user at a target client. The token exchange manager 920 may be configured to support transmitting the inter-client token to a second authorization server of the one or more authorization servers. The token exchange manager 920 may be configured to support establishing, based on the inter-client token, the session for the user at the target client and via the second authorization server, where the session is established in accordance with a second authorization procedure between the target client and the second authorization server.

By including or configuring the token exchange manager 920 in accordance with examples as described herein, the device 905 may support techniques for improved user experience and improved security levels related to an SSO procedure.

Figure 10:
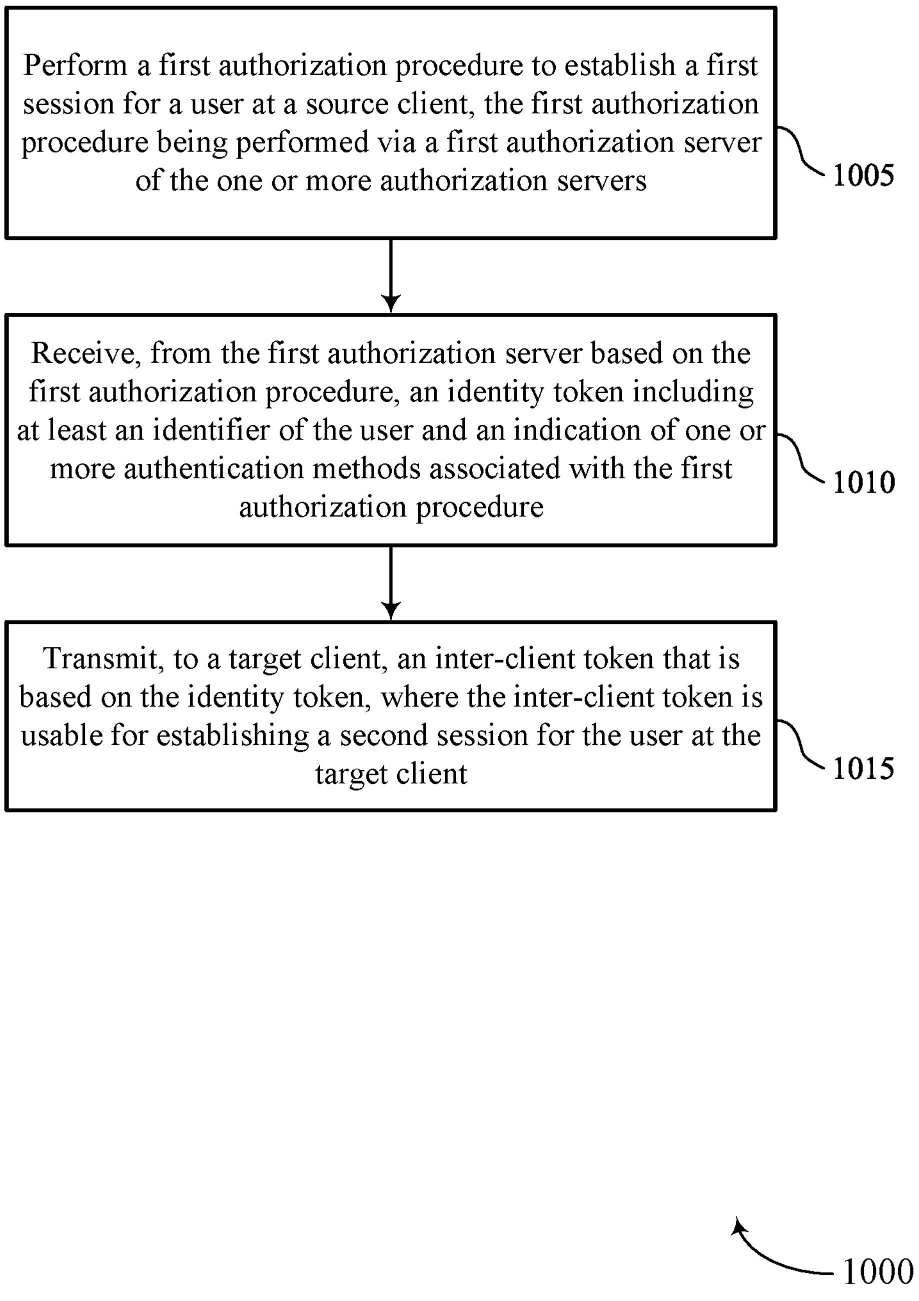
FIGS. 10 through 13 show flowcharts illustrating methods that support techniques for inter-client authorization in accordance with aspects of the present disclosure.

FIG. 10 shows a flowchart illustrating a method 1000 that supports techniques for inter-client authorization in accordance with aspects of the present disclosure. The operations of the method 1000 may be implemented by a source client or its components as described herein. For example, the operations of the method 1000 may be performed by a source client as described with reference to FIGS. 1 through 6. In some examples, a source client may execute a set of instructions to control the functional elements of the source client to perform the described functions. Additionally, or alternatively, the source client may perform aspects of the described functions using special-purpose hardware.

At 1005, the method may include performing a first authorization procedure to establish a first session for a user at a source client, the first authorization procedure being performed via a first authorization server of the one or more authorization servers. The operations of 1005 may be performed in accordance with examples as disclosed herein. In some examples, aspects of the operations of 1005 may be performed by an authorization procedure component 525 as described with reference to FIG. 5.

At 1010, the method may include receiving, from the first authorization server based on the first authorization procedure, an identity token including at least an identifier of the user and an indication of one or more authentication methods associated with the first authorization procedure. The operations of 1010 may be performed in accordance with examples as disclosed herein. In some examples, aspects of the operations of 1010 may be performed by an identity token component 530 as described with reference to FIG. 5.

At 1015, the method may include transmitting, to a target client, an inter-client token that is based on the identity token, where the inter-client token is usable for establishing a second session for the user at the target client. The operations of 1015 may be performed in accordance with examples as disclosed herein. In some examples, aspects of the operations of 1015 may be performed by an inter-client token component 535 as described with reference to FIG. 5.

Figure 11:
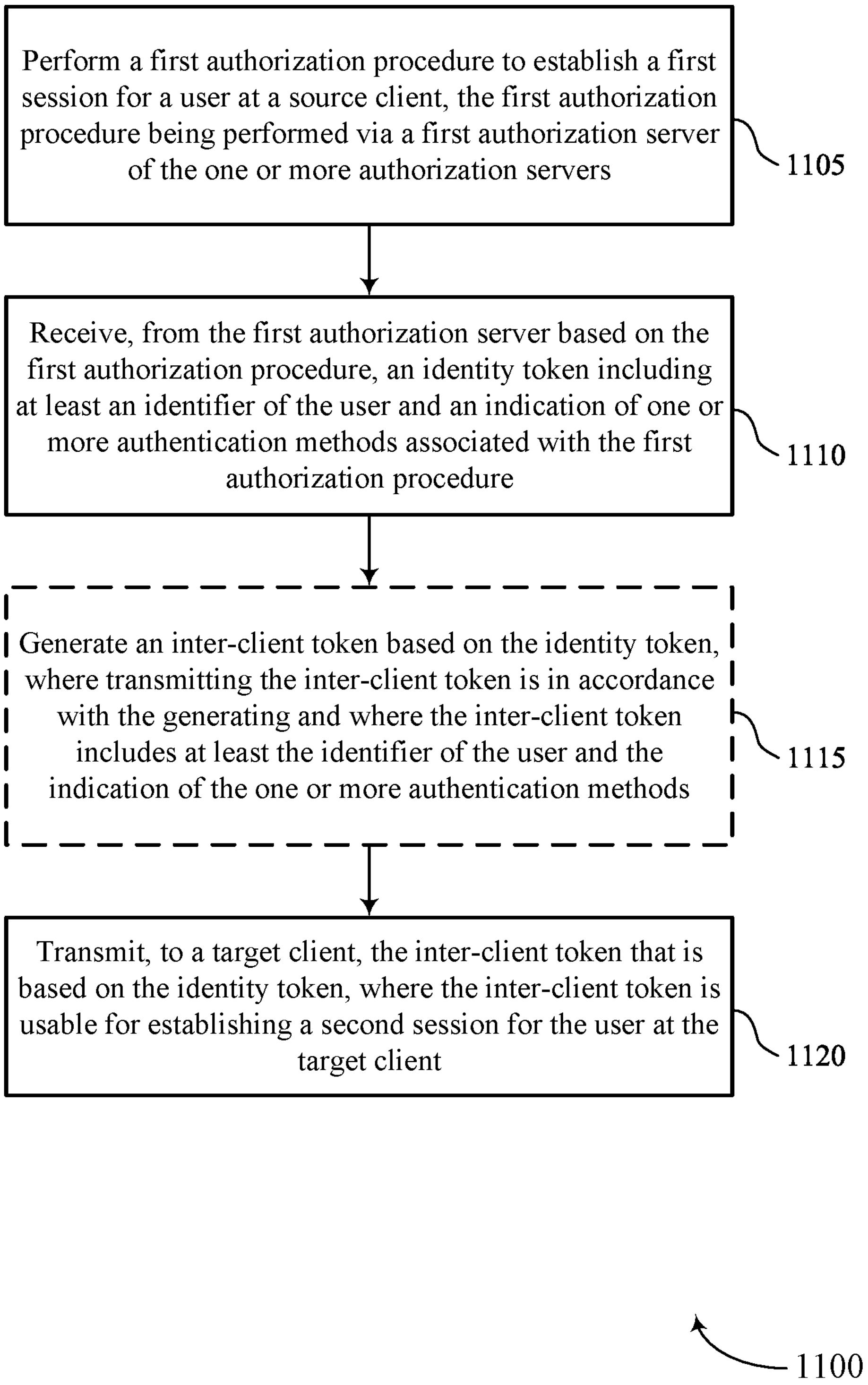

FIG. 11 shows a flowchart illustrating a method 1100 that supports techniques for inter-client authorization in accordance with aspects of the present disclosure. The operations of the method 1100 may be implemented by a source client or its components as described herein. For example, the operations of the method 1100 may be performed by a source client as described with reference to FIGS. 1 through 6. In some examples, a source client may execute a set of instructions to control the functional elements of the source client to perform the described functions. Additionally, or alternatively, the source client may perform aspects of the described functions using special-purpose hardware.

At 1105, the method may include performing a first authorization procedure to establish a first session for a user at a source client, the first authorization procedure being performed via a first authorization server of the one or more authorization servers. The operations of 1105 may be performed in accordance with examples as disclosed herein. In some examples, aspects of the operations of 1105 may be performed by an authorization procedure component 525 as described with reference to FIG. 5.

At 1110, the method may include receiving, from the first authorization server based on the first authorization procedure, an identity token including at least an identifier of the user and an indication of one or more authentication methods associated with the first authorization procedure. The operations of 1110 may be performed in accordance with examples as disclosed herein. In some examples, aspects of the operations of 1110 may be performed by an identity token component 530 as described with reference to FIG. 5.

At 1115, the method may include generating the inter-client token based on the identity token, where transmitting the inter-client token is in accordance with the generating and where the inter-client token includes at least the identifier of the user and the indication of the one or more authentication methods. The operations of 1115 may be performed in accordance with examples as disclosed herein. In some examples, aspects of the operations of 1115 may be performed by a token generation component 540 as described with reference to FIG. 5.

At 1120, the method may include transmitting, to a target client, an inter-client token that is based on the identity token, where the inter-client token is usable for establishing a second session for the user at the target client. The operations of 1120 may be performed in accordance with examples as disclosed herein. In some examples, aspects of the operations of 1120 may be performed by an inter-client token component 535 as described with reference to FIG. 5.

Figure 12:
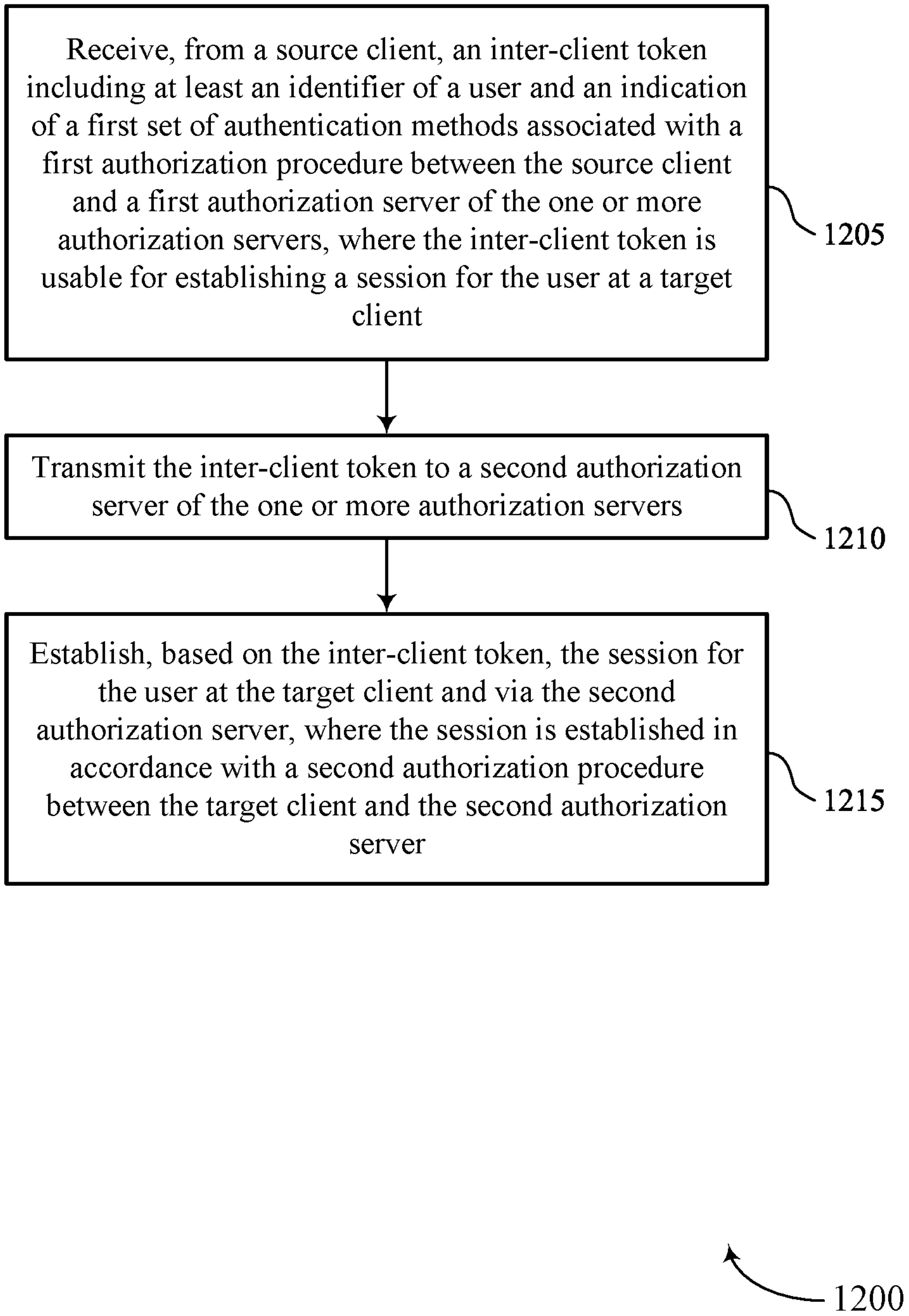

FIG. 12 shows a flowchart illustrating a method 1200 that supports techniques for inter-client authorization in accordance with aspects of the present disclosure. The operations of the method 1200 may be implemented by a target client or its components as described herein. For example, the operations of the method 1200 may be performed by a target client as described with reference to FIGS. 1 through 3 and 7 through 9. In some examples, a target client may execute a set of instructions to control the functional elements of the target client to perform the described functions. Additionally, or alternatively, the target client may perform aspects of the described functions using special-purpose hardware.

At 1205, the method may include receiving, from a source client, an inter-client token including at least an identifier of a user and an indication of a first set of authentication methods associated with a first authorization procedure between the source client and a first authorization server of the one or more authorization servers, where the inter-client token is usable for establishing a session for the user at a target client. The operations of 1205 may be performed in accordance with examples as disclosed herein. In some examples, aspects of the operations of 1205 may be performed by an inter-client token component 825 as described with reference to FIG. 8.

At 1210, the method may include transmitting the inter-client token to a second authorization server of the one or more authorization servers. The operations of 1210 may be performed in accordance with examples as disclosed herein. In some examples, aspects of the operations of 1210 may be performed by a token exchange component 830 as described with reference to FIG. 8.

At 1215, the method may include establishing, based on the inter-client token, the session for the user at the target client and via the second authorization server, where the session is established in accordance with a second authorization procedure between the target client and the second authorization server. The operations of 1215 may be performed in accordance with examples as disclosed herein. In some examples, aspects of the operations of 1215 may be performed by an authorization procedure component 835 as described with reference to FIG. 8.

Figure 13:
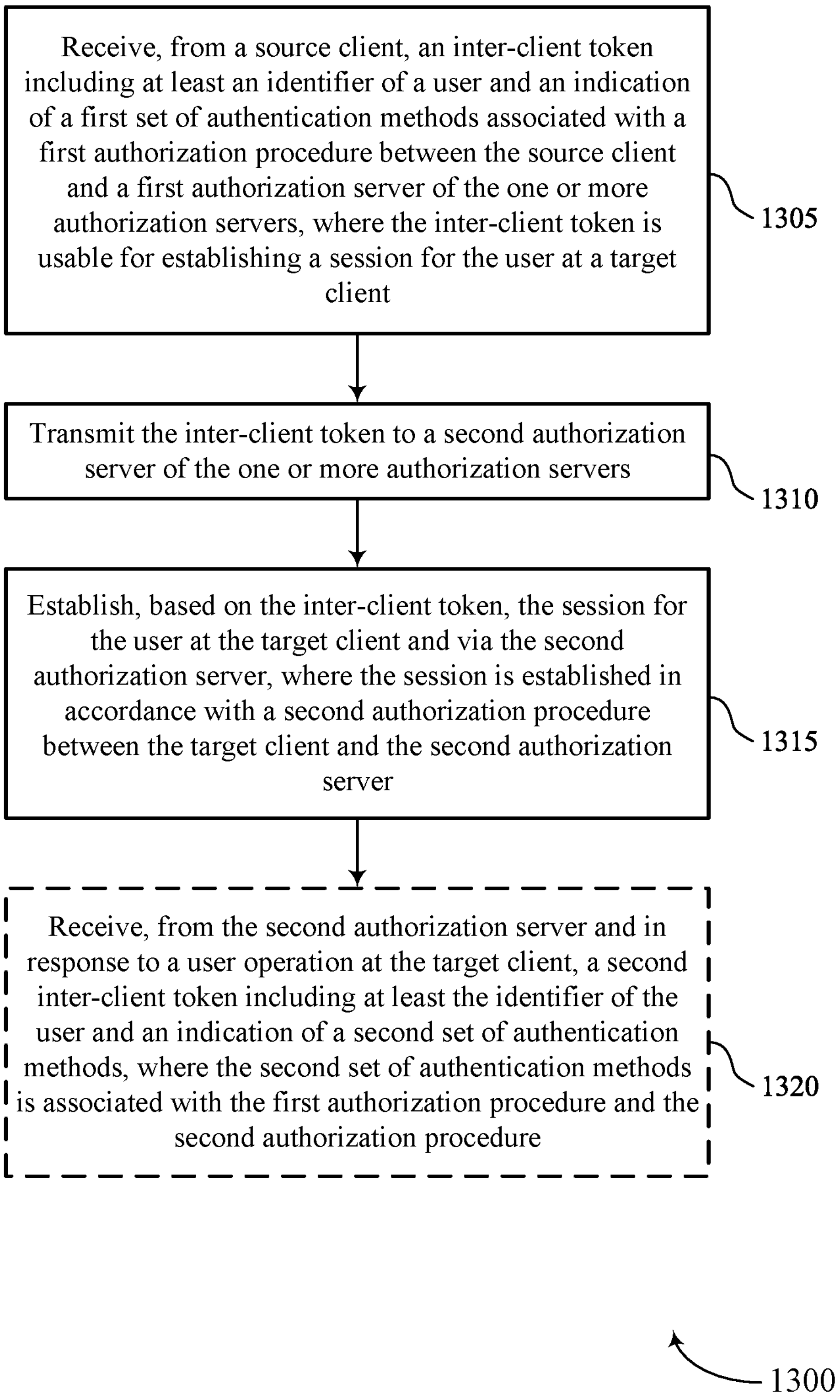

FIG. 13 shows a flowchart illustrating a method 1300 that supports techniques for inter-client authorization in accordance with aspects of the present disclosure. The operations of the method 1300 may be implemented by a target client or its components as described herein. For example, the operations of the method 1300 may be performed by a target client as described with reference to FIGS. 1 through 3 and 7 through 9. In some examples, a target client may execute a set of instructions to control the functional elements of the target client to perform the described functions. Additionally, or alternatively, the target client may perform aspects of the described functions using special-purpose hardware.

At 1305, the method may include receiving, from a source client, an inter-client token including at least an identifier of a user and an indication of a first set of authentication methods associated with a first authorization procedure between the source client and a first authorization server of the one or more authorization servers, where the inter-client token is usable for establishing a session for the user at a target client. The operations of 1305 may be performed in accordance with examples as disclosed herein. In some examples, aspects of the operations of 1305 may be performed by an inter-client token component 825 as described with reference to FIG. 8.

At 1310, the method may include transmitting the inter-client token to a second authorization server of the one or more authorization servers. The operations of 1310 may be performed in accordance with examples as disclosed herein. In some examples, aspects of the operations of 1310 may be performed by a token exchange component 830 as described with reference to FIG. 8.

At 1315, the method may include establishing, based on the inter-client token, the session for the user at the target client and via the second authorization server, where the session is established in accordance with a second authorization procedure between the target client and the second authorization server. The operations of 1315 may be performed in accordance with examples as disclosed herein. In some examples, aspects of the operations of 1315 may be performed by an authorization procedure component 835 as described with reference to FIG. 8.

At 1320, the method may include receiving, from the second authorization server and in response to a user operation at the target client, a second inter-client token including at least the identifier of the user and an indication of a second set of authentication methods, where the second set of authentication methods is associated with the first authorization procedure and the second authorization procedure. The operations of 1320 may be performed in accordance with examples as disclosed herein. In some examples, aspects of the operations of 1320 may be performed by an inter-client token component 825 as described with reference to FIG. 8.

The following provides an overview of aspects of the present disclosure:

Aspect 1: A computer-implemented method for establishing sessions via one or more authorization servers, comprising: performing a first authorization procedure to establish a first session for a user at a source client, the first authorization procedure being performed via a first authorization server of the one or more authorization servers; receiving, from the first authorization server based at least in part on the first authorization procedure, an identity token comprising at least an identifier of the user and an indication of one or more authentication methods associated with the first authorization procedure; and transmitting, to a target client, an inter-client token that is based at least in part on the identity token, wherein the inter-client token is usable for establishing a second session for the user at the target client.

Aspect 2: The computer-implemented method of aspect 1, further comprising: generating the inter-client token based at least in part on the identity token, wherein transmitting the inter-client token is in accordance with the generating and wherein the inter-client token comprises at least the identifier of the user and the indication of the one or more authentication methods.

Aspect 3: The computer-implemented method of any of aspects 1 through 2, wherein receiving the identity token comprises: receiving the identity token based at least in part on a user operation at the source client.

Aspect 4: The computer-implemented method of aspect 3, wherein receiving the identity token comprises: receiving the identity token and one or more of a session token, an actor token, or a refresh token based at least in part on the user operation at the source client.

Aspect 5: The computer-implemented method of any of aspects 1 through 4, wherein the inter-client token further comprises one or more of an indication of an expiration of the inter-client token, an identifier of the inter-client token to be stored at a second authorization server after use of the inter-client token, or an identifier of the target client.

Aspect 6: The computer-implemented method of any of aspects 1 through 5, wherein the identity token includes a signature based at least in part on the identity token being cryptographically signed via the first authorization server, and wherein establishing the second session is based at least in part on the signature being valid.

Aspect 7: The computer-implemented method of any of aspects 1 through 6, wherein the indication of the one or more authentication methods comprises a plurality of values associated with the one or more authentication methods.

Aspect 8: The computer-implemented method of any of aspects 1 through 7, wherein the inter-client token comprises a one-time use token.

Aspect 9: The computer-implemented method of any of aspects 1 through 8, wherein transmitting the inter-client token to the target client comprises: transmitting the inter-client token to the target client via a URL redirect, an application deep link, a BLUETOOTH link, a NFC app-to-app exchange, a QR code, a local TCP or IP, or any combination thereof.

Aspect 10: The computer-implemented method of any of aspects 1 through 9, wherein the inter-client token is usable for establishing the second session via the first authorization server or a second authorization server of the one or more authorization servers, and wherein the inter-client token is usable for establishing the second session according to the first authorization procedure or a second authorization procedure.

Aspect 11: The computer-implemented method of any of aspects 1 through 10, wherein the source client comprises a first application on a first device and the target client comprises a second application on the first device or a second device.

Aspect 12: The computer-implemented method of aspect 11, wherein the first application comprises a first type of application and the second application comprises a second type of application that is different from the first type of application.

Aspect 13: A computer-implemented method for establishing sessions via one or more authorization servers, comprising: receiving, from a source client, an inter-client token comprising at least an identifier of a user and an indication of a first set of authentication methods associated with a first authorization procedure between the source client and a first authorization server of the one or more authorization servers, wherein the inter-client token is usable for establishing a session for the user at a target client; transmitting the inter-client token to a second authorization server of the one or more authorization servers; and establishing, based at least in part on the inter-client token, the session for the user at the target client and via the second authorization server, wherein the session is established in accordance with a second authorization procedure between the target client and the second authorization server.

Aspect 14: The computer-implemented method of aspect 13, further comprising: receiving, from the second authorization server and in response to a user operation at the target client, a second inter-client token comprising at least the identifier of the user and an indication of a second set of authentication methods, wherein the second set of authentication methods is associated with the first authorization procedure and the second authorization procedure.

Aspect 15: The computer-implemented method of any of aspects 13 through 14, further comprising: receiving, from the second authorization server, a request to verify an identity of the user via an authentication method, wherein receiving the request is based at least in part on an assurance level associated with the first set of authentication methods failing to satisfy a threshold level of assurance associated with the second authorization procedure, wherein establishing the session for the user at the target client is based at least in part on successfully verifying the identity of the user via the authentication method.

Aspect 16: The computer-implemented method of any of aspects 13 through 15, wherein the indication of the first set of authentication methods comprises a plurality of values associated with the first set of authentication methods.

Aspect 17: The computer-implemented method of any of aspects 13 through 16, further comprising: receiving, with the inter-client token, one or more of an indication of an expiration of the inter-client token, an identifier of the inter-client token to be stored at the second authorization server after use of the inter-client token, or an indication of the target client.

Aspect 18: The computer-implemented method of any of aspects 13 through 17, wherein the inter-client token includes a signature based at least in part on the inter-client token being cryptographically signed via the first authorization server, and wherein establishing the session is based at least in part on the signature being valid.

Aspect 19: The computer-implemented method of any of aspects 13 through 18, wherein the inter-client token comprises a one-time use token.

Aspect 20: The computer-implemented method of any of aspects 13 through 19, wherein receiving the inter-client token from the source client comprises: receiving the inter-client token from the source client via a URL redirect, an application deep link, a BLUETOOTH link, a NFC app-to-app exchange, a QR code, a local TCP or IP, or any combination thereof.

Aspect 21: The computer-implemented method of any of aspects 13 through 20, wherein establishing the session is further based at least in part on a trust relationship between the first authorization server and the second authorization server.

Aspect 22: An apparatus for establishing sessions via one or more authorization servers, comprising one or more memories storing processor-executable code, and one or more processors coupled with the one or more memories and individually or collectively operable to execute the code to cause the apparatus to perform a method of any of aspects 1 through 12.

Aspect 23: An apparatus for establishing sessions via one or more authorization servers, comprising at least one means for performing a method of any of aspects 1 through 12.

Aspect 24: A non-transitory computer-readable medium storing code for establishing sessions via one or more authorization servers, the code comprising instructions executable by one or more processors to perform a method of any of aspects 1 through 12.

Aspect 25: An apparatus for establishing sessions via one or more authorization servers, comprising one or more memories storing processor-executable code, and one or more processors coupled with the one or more memories and individually or collectively operable to execute the code to cause the apparatus to perform a method of any of aspects 13 through 21.

Aspect 26: An apparatus for establishing sessions via one or more authorization servers, comprising at least one means for performing a method of any of aspects 13 through 21.

Aspect 27: A non-transitory computer-readable medium storing code for establishing sessions via one or more authorization servers, the code comprising instructions executable by one or more processors to perform a method of any of aspects 13 through 21.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations, and does not represent all the examples that may be implemented, or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by one or more processors, firmware, or any combination thereof. If implemented in software executed by one or more processors, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A computer-implemented method for establishing sessions via one or more authorization servers, comprising:

performing a first authorization procedure to establish a first session for a user at a source client, the first authorization procedure being performed via a first authorization server of the one or more authorization servers;

receiving, from the first authorization server based at least in part on the first authorization procedure, an identity token comprising at least an identifier of the user and an indication of one or more authentication methods that the user was authenticated with based at least in part on performing the first authorization procedure; and transmitting, to a target client, an inter-client token that is based at least in part on the identity token, wherein the inter-client token comprises the indication of the one or more authentication methods, and is used for establishing a second session for the user at the target client.

2. The computer-implemented method of claim 1, further comprising:

generating the inter-client token based at least in part on the identity token, wherein transmitting the inter-client token is in accordance with the generating and wherein the inter-client token comprises at least the identifier of the user and the indication of the one or more authentication methods.

3. The computer-implemented method of claim 1, wherein receiving the identity token comprises:

receiving the identity token based at least in part on a user operation at the source client.

4. The computer-implemented method of claim 3, wherein receiving the identity token comprises:

receiving the identity token and one or more of a session token, an actor token, or a refresh token based at least in part on the user operation at the source client.

5. The computer-implemented method of claim 1, wherein the inter-client token further comprises one or more of an indication of an expiration of the inter-client token, an identifier of the inter-client token to be stored at a second authorization server after use of the inter-client token, or an identifier of the target client.

6. The computer-implemented method of claim 1, wherein the identity token includes a signature based at least in part on the identity token being cryptographically signed via the first authorization server, and wherein establishing the second session is based at least in part on the signature being valid.

7. The computer-implemented method of claim 1, wherein the indication of the one or more authentication methods comprises a plurality of values associated with the one or more authentication methods.

8. The computer-implemented method of claim 1, wherein the inter-client token comprises a one-time use token.

9. The computer-implemented method of claim 1, wherein the inter-client token is usable for establishing the second session via the first authorization server or a second authorization server of the one or more authorization servers, and wherein the inter-client token is usable for establishing the second session according to the first authorization procedure or a second authorization procedure.

10. The computer-implemented method of claim 1, wherein the source client comprises a first application on a first device and the target client comprises a second application on the first device or a second device.

11. The computer-implemented method of claim 10, wherein the first application comprises a first type of application and the second application comprises a second type of application that is different from the first type of application.

12. A computer-implemented method for establishing sessions via one or more authorization servers, comprising:

receiving, from a source client, an inter-client token comprising at least an identifier of a user and an indication of a first set of authentication methods that the user was authenticated with based at least in part on a first authorization procedure between the source client and a first authorization server of the first set of authorization servers, wherein the inter-client token comprises the indication of the one or more authentication methods, and is used for establishing a session for the user at a target client;

transmitting the inter-client token to a second authorization server of the one or more authorization servers; and establishing, based at least in part on the inter-client token, the session for the user at the target client and via the second authorization server, wherein the session is established in accordance with a second authorization procedure between the target client and the second authorization server.

13. The computer-implemented method of claim 12, further comprising:

receiving, from the second authorization server and in response to a user operation at the target client, a second inter-client token comprising at least the identifier of the user and an indication of a second set of authentication methods, wherein the second set of authentication methods is associated with the first authorization procedure and the second authorization procedure.

14. The computer-implemented method of claim 12, further comprising:

receiving, from the second authorization server, a request to verify an identity of the user via an authentication method, wherein receiving the request is based at least in part on an assurance level associated with the first set of authentication methods failing to satisfy a threshold level of assurance associated with the second authorization procedure, wherein establishing the session for the user at the target client is based at least in part on successfully verifying the identity of the user via the authentication method.

15. The computer-implemented method of claim 12, wherein the indication of the first set of authentication methods comprises a plurality of values associated with the first set of authentication methods.

16. The computer-implemented method of claim 12, further comprising:

receiving, with the inter-client token, one or more of an indication of an expiration of the inter-client token, an identifier of the inter-client token to be stored at the second authorization server after use of the inter-client token, or an indication of the target client.

17. The computer-implemented method of claim 12, wherein the inter-client token includes a signature based at least in part on the inter-client token being cryptographically signed via the first authorization server, and wherein establishing the session is based at least in part on the signature being valid.

18. The computer-implemented method of claim 12, wherein establishing the session is further based at least in part on a trust relationship between the first authorization server and the second authorization server.

19. An apparatus for establishing sessions via one or more authorization servers, comprising:

one or more memories storing processor-executable code; and one or more processors coupled with the one or more memories and individually or collectively operable to execute the code to cause the apparatus to:

perform a first authorization procedure to establish a first session for a user at a source client, the first authorization procedure being performed via a first authorization server of the one or more authorization servers;

receive, from the first authorization server based at least in part on the first authorization procedure, an identity token comprising at least an identifier of the user and an indication of one or more authentication methods that the user was authenticated with based at least in part on performing the first authorization procedure; and transmit, to a target client, an inter-client token that is based at least in part on the identity token, wherein the inter-client token comprises the indication of the one or more authentication methods, and is used for establishing a second session for the user at the target client.

20. The apparatus of claim 19, wherein, to transmit the inter-client token to the target client, the one or more processors are individually or collectively operable to execute the code to cause the apparatus to:

transmit the inter-client token to the target client via a uniform resource locator (URL) redirect, an application deep link, a BLUETOOTH link, a near field communication (NFC) app-to-app exchange, a quick response (QR) code, a local transmission control protocol (TCP) or internet protocol (IP), or any combination thereof.

* * * * *